United States Patent
Craner et al.

(10) Patent No.: US 8,160,426 B2
(45) Date of Patent: Apr. 17, 2012

(54) STORAGE MANAGEMENT OF A RECORDING DEVICE IN A MULTI-USER SYSTEM

(75) Inventors: Michael L. Craner, Exton, PA (US); Robert A. Knee, Lansdale, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 1201 days.

(21) Appl. No.: 11/974,259

(22) Filed: Oct. 12, 2007

(65) Prior Publication Data

US 2009/0100478 A1 Apr. 16, 2009

(51) Int. Cl.
*H04N 5/76* (2006.01)
(52) U.S. Cl. ........ 386/292; 386/291; 386/295; 386/296; 725/44; 725/46; 725/50
(58) Field of Classification Search .................. 386/239, 386/248, 261, 262, 291–299; 725/37, 44–50, 725/53, 58, 61
See application file for complete search history.

(56) References Cited

U.S. PATENT DOCUMENTS

| | | | |
|---|---|---|---|
| 2003/0235395 A1 | 12/2003 | Boston et al. | |
| 2003/0237085 A1 | 12/2003 | Boston et al. | |
| 2003/0237086 A1 | 12/2003 | Boston et al. | |
| 2004/0006698 A1 | 1/2004 | Apfelbaum | |
| 2004/0015992 A1* | 1/2004 | Hasegawa et al. | 725/86 |
| 2004/0101271 A1 | 5/2004 | Boston et al. | |
| 2006/0206912 A1* | 9/2006 | Klarfeld et al. | 725/40 |
| 2008/0141310 A1* | 6/2008 | Kunkel | 725/58 |

* cited by examiner

*Primary Examiner* — Thai Tran
*Assistant Examiner* — Mishawn Dunn
(74) *Attorney, Agent, or Firm* — Ropes & Gray LLP

(57) ABSTRACT

Systems and methods for managing the storage of recordings in a recording device in which the recordings were requested by several users are provided. Each user may be assigned a storage space limit defining the amount of storage space each user is entitled to use. In some embodiments, the storage space limit may be flexibly increased to take advantage of extra space available from other users. The system may intelligently borrow space from other users to limit the risk that a requested recording is canceled due to unavailable storage resources. In some embodiments, the system may jointly allocate a recording to several users who commonly requested a recording. The system may also set aside space in the recording device that is saved exclusively for a particular user. In some embodiments, the recording device may allocate the storage resources based on the usage of the recordings.

24 Claims, 11 Drawing Sheets

| User | Current Storage Space Allocation | Current Storage Space Used | Allocation Prior to Flexible Change |
|---|---|---|---|
| User 1 | 190MB | Yankees 100MB<br>24 20MB<br>James Bond 60MB<br>... ... | 150MB |
| ... | ... | ... | ... |
| User N | 60MB | Friends - 10MB | 120MB |

FIG. 11

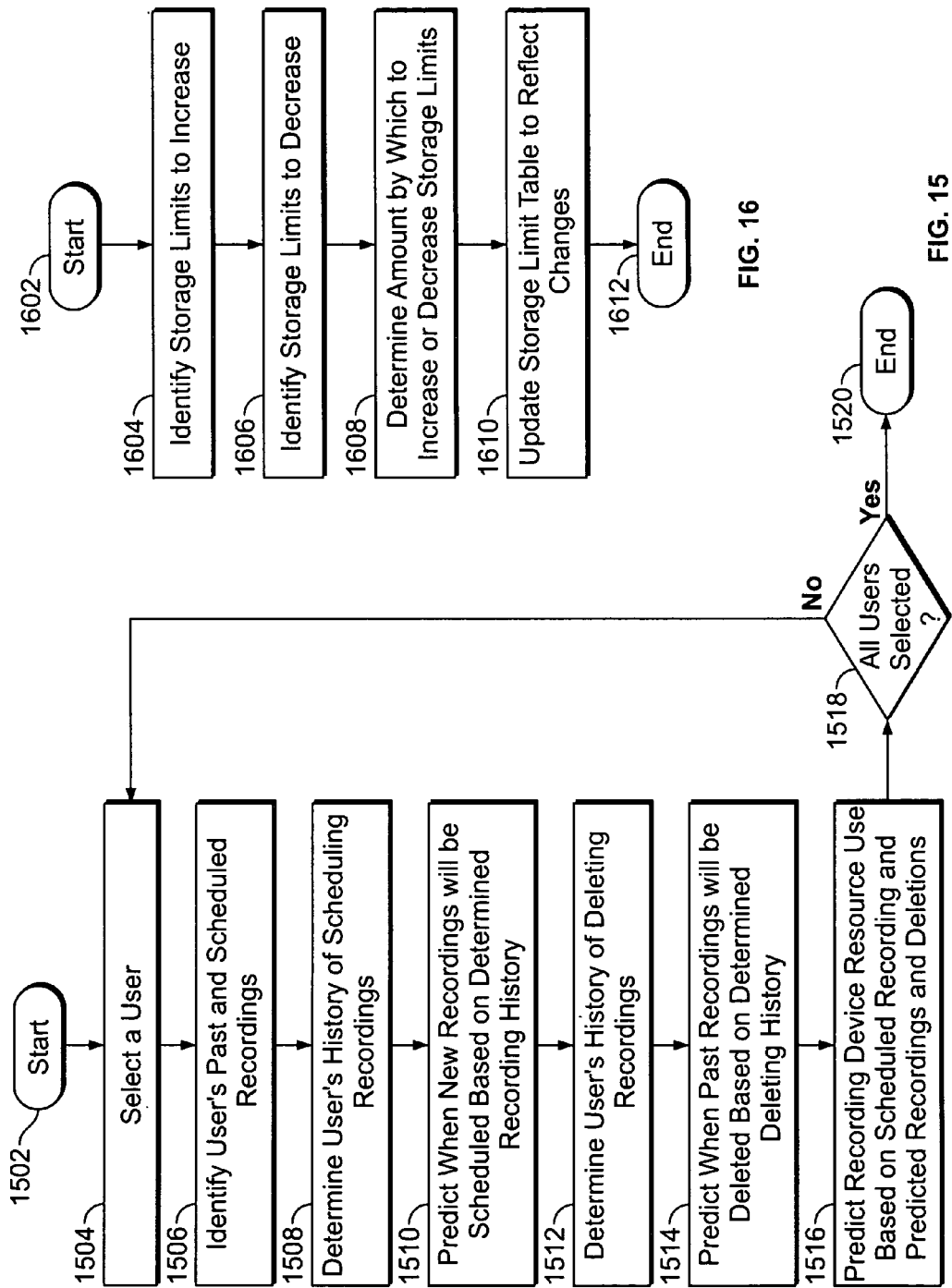

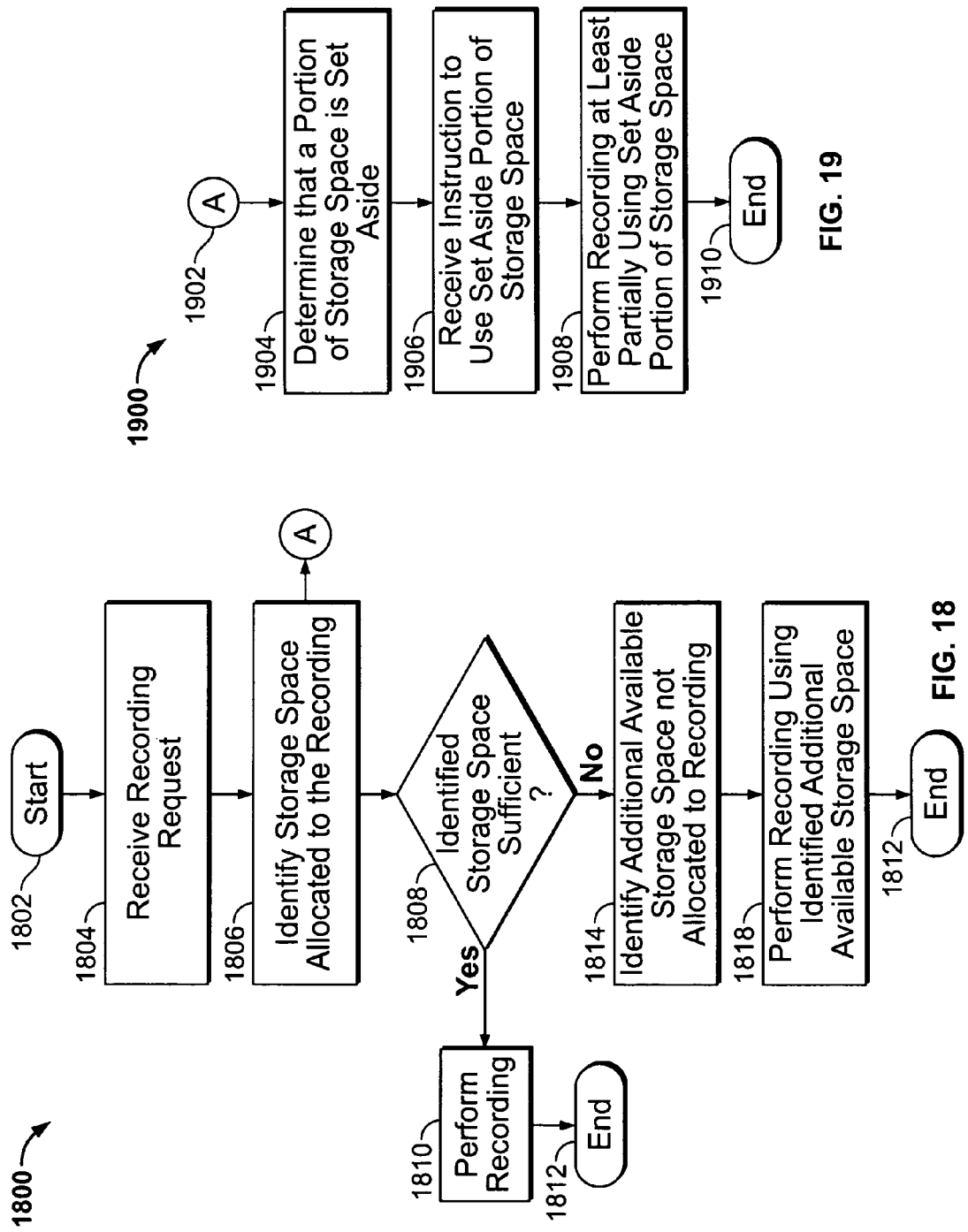

STORAGE MANAGEMENT OF A RECORDING DEVICE IN A MULTI-USER SYSTEM

BACKGROUND OF THE INVENTION

This invention is related to systems and methods for managing the storage in a recording device of a multi-user media system.

In some media recording systems, such as home media recording systems, a number of different users typically have access to the system's recording device (e.g., a DVR). For example, a family that includes a father, a mother, and two children may use a media system that includes a DVR. Each user, using for example an interactive media guidance application implemented on the media system, may direct the DVR to perform recordings. Recordings are performed as they are scheduled until the recording device is full. When the recording device becomes full, the interactive media guidance application may cancel future recordings, or delete stored recordings to make room for future recordings. Because the recording device may not track which user requested a recording, different users or a group of users may monopolize the device, or otherwise affect other users' recordings.

SUMMARY OF THE INVENTION

Thus, an interactive media guidance application is provided in which storage space of a recording device which is used by several users is managed to ensure that each user may have a desired amount of storage. The interactive media guidance application may allocate storage space of the recording device to each user of the media system. In some embodiments, the interactive media guidance application may instead or in addition allocate storage space of the recording device to usages of media recorded using the recording device. Each allocation of storage space may be characterized by a storage space limit per user (or a usage storage limit) defining the amount of space that each user (or usage) is accorded in the recording device.

In some embodiments, storage space limits may be flexibly increased or decreased (e.g., by dynamically reallocating users' storage space as a function of usage trending) to accommodate the recording requests of the users. For example, if a first user who has reached his storage space limit wishes to perform an additional recording, the interactive media guidance application may determine whether one or more other users have unused storage space that may be borrowed by the first user. In response to determining that another user has available storage space that can be borrowed, the interactive media guidance application may flexibly increase the first user's storage limit and flexibly decrease the other user's storage limit to allow the first user to schedule the recording. When the borrowee user requests to perform a recording that would require that the borrowed storage space be returned, the interactive media guidance application may, if necessary, delete a stored recording of the first user to return the borrowed storage space to the other user, bringing the first user back within the user's unflexed limit. In some embodiments, limits may be set and flexibly violated, or the limits themselves may be set initially and moved (e.g., temporarily) to accommodate additional space needs. In some embodiments, the interactive media guidance application may predict the expected use of the storage space of the recording device, and increase or decrease storage limits at various times.

If the interactive media guidance application determines that a recording can be allocated to several blocks of storage space (e.g., allocated to the storage space associated with several users or with several usages), the interactive media guidance application records to the several allocated blocks of storage. For example, the interactive media guidance application may record equal portions of a program to each storage block, or may unequally record the program based on any suitable criteria (e.g., relative priority for the recording, remaining space available in each block, or priority of each block). In some embodiments, the interactive media guidance application may instead or in addition define storage space that is jointly allocated to several users, usages or both (e.g., a block of storage space set aside for jointly allocated recordings), and record media requested by the several users or that satisfies the several usages to the jointly allocated storage space.

In some embodiments, the interactive media guidance application may set aside a portion of one or more storage allocations for a specific purpose. For example, the interactive media guidance application may set aside a portion of the recording device storage space for common use. As another example, the interactive media guidance application may set aside a portion of the recording device storage space for exclusive use by a particular user or usage. As still another example, the interactive media guidance application may set aside a portion of recording device space for several users, usages or both (e.g., joint allocation of a set aside). In some embodiments, the set aside portion may not be used to flexibly increase another user's storage limit. To access the set aside portion (e.g., to record to the set aside portion, delete from the set aside portion, or move to and from the set aside portion), the interactive media guidance application may require the user to enter a password or other authorization instruction.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 11 is a schematic display of an illustrative data structure for storing the media system users' storage limits in accordance with one embodiment of the invention;

FIG. 15 is a flow chart of an illustrative process for predicting a user's expected use of recording device resources in accordance with one embodiment of the invention;

FIG. 16 is a flow chart of an illustrative process for flexibly increasing a user's storage limit in accordance with one embodiment of the invention;

FIG. 18 is a flow chart of an illustrative process for storing a requested recording in accordance with one embodiment of the invention; and FIG. 19 is a flow chart of an illustrative process for managing portions of storage space that have been set aside in accordance with one embodiment of the invention.

DETAILED DESCRIPTION

Figure 1:
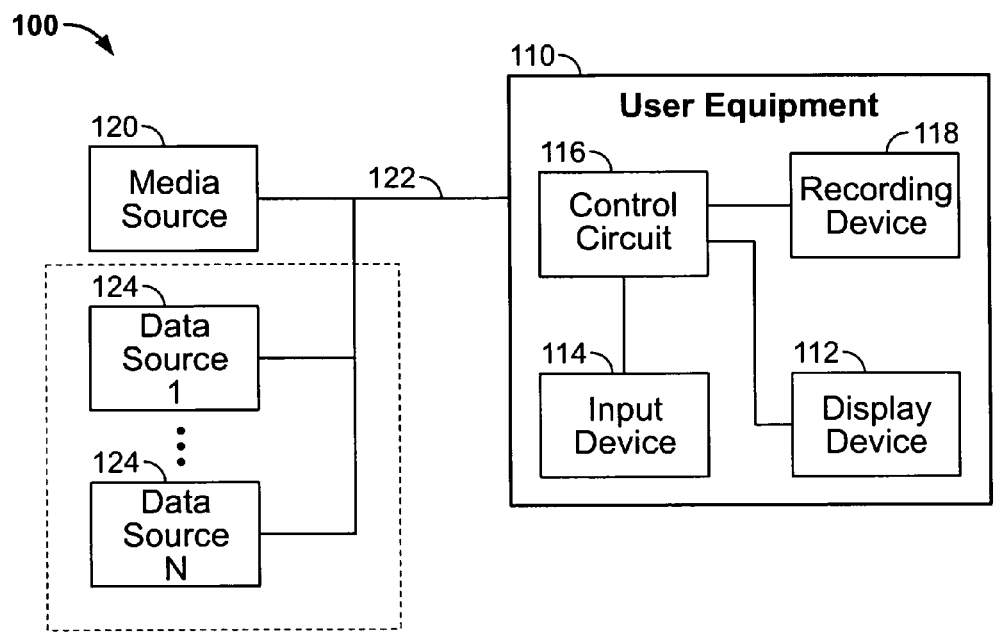
FIG. 1 is a diagram of an illustrative interactive media system in accordance with one embodiment of the invention.

FIG. 1 is illustrative interactive media system 100 in accordance with one embodiment of the invention. User equipment 110 receives media in the form of signals from media source 120 over communications path 122. In practice there may be multiple media sources 120 and user equipment 110, but only one of each has been shown in FIG. 1 to avoid over-complicating the drawing.

Media source 120 may be any suitable media source such as, for example, a cable system headend, satellite media distribution facility, media broadcast facility, internet protocol television (IPTV) headend, on-demand server (e.g., VOD server), website, game service provider (e.g., for online gaming), or any other suitable facility or system for originating or distributing media. Media source 120 may be configured to transmit signals over any suitable communications path 122 including, for example, a satellite path, a fiber-optic path, a cable path, an Internet path, or any other suitable wired or wireless path. The signals may carry any suitable media such as, for example, television programs, games, music, news, web services, video, or any other suitable media. In some embodiments, media source 120 may include control circuitry for executing requests from a trick-play client or an interactive media guidance application implemented in, for example, user equipment 110 or a VOD server.

User equipment 110 may include any equipment suitable for providing an interactive media experience. User equipment 110 may include television equipment such as a television, set-top box, recording device, video player, user input device, or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a fixed electronic device such as, for example, a gaming system (e.g., X-Box, PlayStation, or GameCube) or a portable electronic device, such as a portable DVD player, a portable gaming device, a cellular telephone, a PDA, a music player (e.g., MP3 player), or any other suitable fixed or portable device.

In the example of FIG. 1, user equipment 110 includes at least control circuitry 116, display device 112, user input device 114, and recording device 118 which may be implemented as separate devices (e.g. in multiple set top boxes that are part of a multi-room DVR system) or as a single device. An interactive media guidance application may be implemented on user equipment 110 to provide media guidance functions to the user for media displayed on display device 112. In some embodiments, the interactive media guidance application may be or include an interactive television application, a trick-play client, or any other application for providing media features to the user.

Display device 112 may be any suitable device such as, for example, a television monitor, a computer monitor, or a display incorporated in user equipment 110 (e.g., a cellular telephone or portable music player display). Display device 112 displays the media transmitted by media source 120 over path 122, and the displays of the trick-play client. Display device 112 may also be configured to provide for the output of audio.

User input device 114 may be any suitable device for interfacing with the interactive media guidance application. For example, user input device 114 may be a remote control, keyboard, mouse, touch pad, touch screen or voice recognition interface. User input device 114 may communicate with user equipment 110 and control circuitry 116 using any suitable communications link. For example, user input device 114 may use an infra-red (IR), radio-frequency, Bluetooth, wireless (e.g., 802.11), wired, or any other suitable communications link.

Control circuitry 116 is adapted to receive user inputs from input device 114 and execute the instructions of the interactive media guidance application. Control circuitry 116 may include one or more tuners (e.g., analog or digital tuners), encoders and decoders (e.g., MPEG decoders), processors (e.g., Motorola 68000 or MIPS family processors), memory 117 (e.g., RAM and hard disks), communications circuitry (e.g., cable modem circuitry), input/output circuitry (e.g., graphics circuitry), connections to the various devices of user equipment 110, and any other suitable component for providing analog or digital media programming, program recording, and interactive media guidance features. In some embodiments, control circuitry 116 may be included as part of one of the devices of user equipment 110 such as, for example, part of display 112 or any other device (e.g., a set-top box, television and video player).

In some embodiments, media system 100 may include several recording devices 118. For the sake of clarity, however, only one is shown in FIG. 1. Recording device 118 may be a personal video recorder (PVR), digital video recorder (DVR), video cassette recorder (VCR), DVD-recorder, compact disc recorder, or any other suitable recording device or storage device. In some embodiments, recording device 118 may be a storage device for storing or recording content or data recorded or provided by other components of interactive media system 100 (e.g., a storage device for caching live television programs to enable trick-play functions). Recording device 118 may include one or more tuners, and may be configured to cache media as the user receives it with user equipment 110 (e.g., cache the currently tuned channel) to provide trick-play functions for the user.

In some embodiments, recording device 118 may include a processor (e.g., a microcontroller or microprocessor or the like) that is used to receive and execute interactive media guidance application instructions. Recording device 118 may include memory for use when executing applications. For example, recording device 118 may include random-access memory. Nonvolatile memory may also be used to store a boot-up routine or other instructions. A hard disk and other storage in recording device 118 may be used to support databases (e.g., a database of media guidance information for recorded programs, or a database of advertisement information for recorded or cached advertisements). A hard disk or other storage in recording device 118 may also be used to record media such as television programs or video-on-demand content or other content provided to recording device 118.

In some embodiments, recording device 118 may include IR communications circuitry or other suitable communications circuitry for communicating with a remote control (e.g., with user input device 114). Recording device 118 may also include dedicated buttons and a front-panel display. The front-panel display may, for example, be used to display the current channel to which the recording device is tuned.

In some embodiments, recording device 118 may be a network recording device that is located outside of user equipment 110. In some embodiments, the network recording device may be incorporated in content source 120 (e.g., at the head-end of a cable plant), data source 124, a VOD server (not shown), user equipment 110 (e.g., as a second recording device, or a hard drive on a home computer), an Internet server, or any other suitable device. In some embodiments, the network recording device may be a stand alone device (e.g., a commercial network recording device, or a DVR device in a home or neighborhood network). The network recording device may receive instructions to perform recordings from the interactive media guidance application implemented on any of a plurality of instances of user equipment 110.

In some embodiments, the interactive media guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to media source 120 and data sources 124. In some embodiments, multiple users may use a single user equipment device 110. A single user may also have multiple instances of user equipment 110. But for the clarity of the figure, only a single user equipment 110 is shown in FIG. 1. The equipment of the plurality of users may be connected to media source 120 and data sources 124 using a cable television network, a satellite television network, a local area network (LAN), a wireless network, the Internet (e.g., using a DOCSIS modem), or any other suitable means. In some embodiments, the equipment of the plurality of users may be connected to each other using any suitable means.

User equipment 110 may receive interactive media guidance application data from one or more data sources 124. Data sources 124 may provide data for a particular type of media or for a particular application. For example, one data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for an interactive media guidance application. Another data source 124 may, for example, provide data for another interactive application (e.g., a home shopping application, and real-time data such as sports scores, stock quotes, news data and weather data). In some embodiments, data sources 124 may provide data to the interactive media guidance application using a client/server approach. There may be one server per data source, one for all sources or, in some embodiments, a single server may communicate as a proxy between user equipment 110 and various data sources 124. In such embodiments, data source 124 may include control circuitry for executing the instructions of the online media guidance application. In some embodiments, data source 124 may be a storage device for storing or recording content or data recorded or provided by other components of interactive media system 100 or by a content or data provider (e.g., a VOD server).

In some embodiments, data source 124 may provide advertisements (e.g., text, graphics and video advertisements for various programs, products, services, and interactive media guidance application features) to the interactive media guidance application. The advertisements may be provided by a dedicated data source, or the advertisements, along with other data, may be provided by one or more data sources.

FIG. 1 shows media source 120 and data sources 124 as separate elements. In practice, their functionality may be combined and provided from a single system at a single facility, or multiple systems at multiple facilities. For example, one media source 120 and data source 124 may be combined to provide VOD content and associated VOD data. As another example, a separate data source 124 may be associated with each of a plurality of television broadcasters and may provide data that is specific to those broadcasters (e.g., advertisements for future programming of the broadcasters, or logo data for displaying broadcasters' logos in interactive media guidance application display screens).

Figure 2:
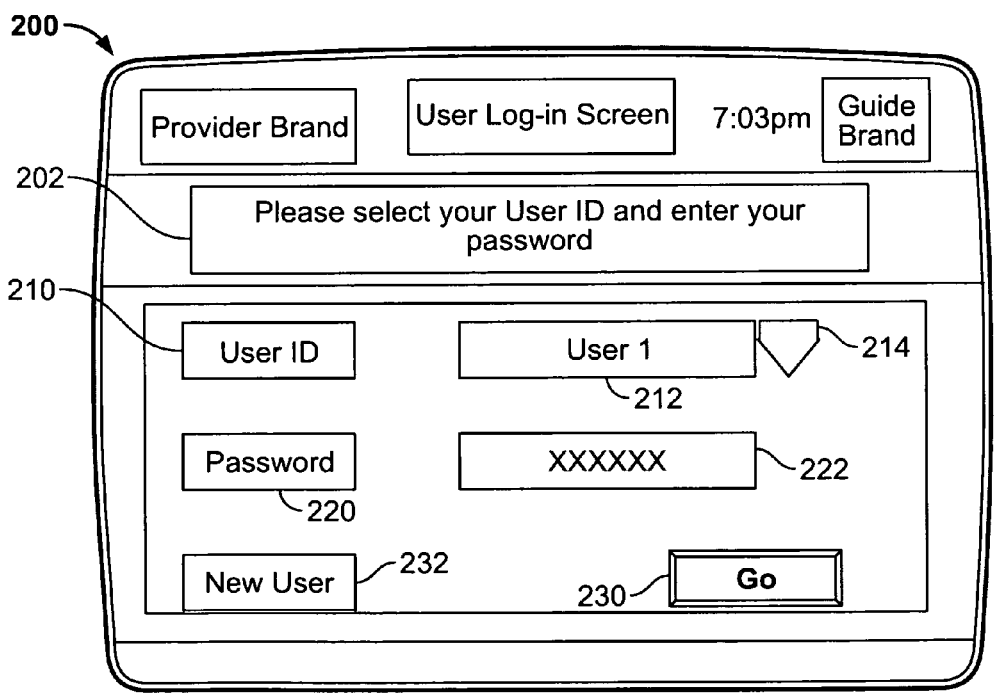
FIG. 2 is an illustrative display screen for logging in to an interactive media guidance application in accordance with one embodiment of the invention.

FIG. 2 is an illustrative display screen for logging in to an interactive media guidance application in accordance with one embodiment of the invention. Display screen 200 may be displayed in multi-user systems in which several users may access features of the interactive media guidance application. For example, display screen 200 may be displayed in multi-user systems in which each user may access personalized interactive media guidance application screens that may be customized for and by each user. As another example, display screen 200 may be displayed in multi-user systems in which each user may access different interactive media guidance application features (e.g., personalized recording features such as listings of recordings set up by me or performed for me).

Display screen 200 includes notice 202 directing a user to select a user ID and enter a password. In some embodiments, notice 200 may direct the user to enter a user ID (e.g., instead of selecting a user ID from drop down menu 212) using input mechanism 114 (FIG. 1). Display screen 200 includes User ID tag 210, and associated drop down menu 212. The user may select or enter a user ID in menu 212 using any suitable approach, including for example entering a user ID using the keys of an input mechanism, selecting a user ID from a drop down menu (e.g., displayed in response to selecting arrow 214), or any other suitable approach. In some embodiments, the user may select an option from a drop down menu for entering a new user ID (e.g., an "other" option following existing user IDs).

If required, the user may enter a password in box 222, which is associated with password tag 220. The user may enter a password using any suitable approach, including for example entering a password key sequence using input mechanism 114 (e.g., selecting keys on input mechanism 114, or selecting on-screen keys corresponding to the user's password).

Figure 4A:
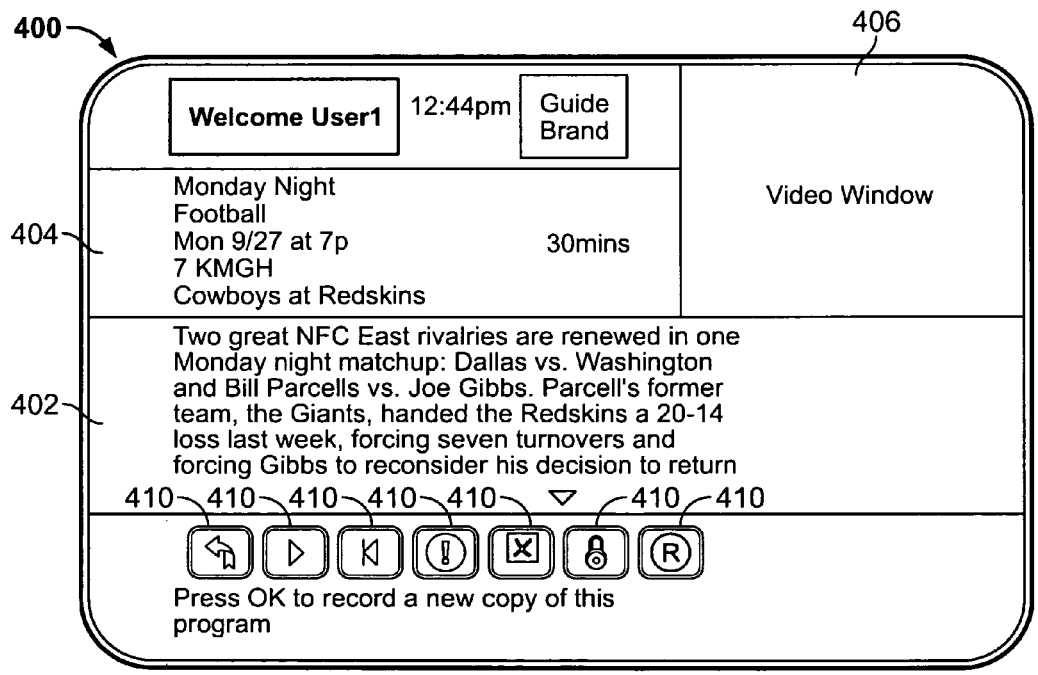
FIG. 4A is an illustrative display of an information screen in accordance with one embodiment of the invention.
Figure 4B:
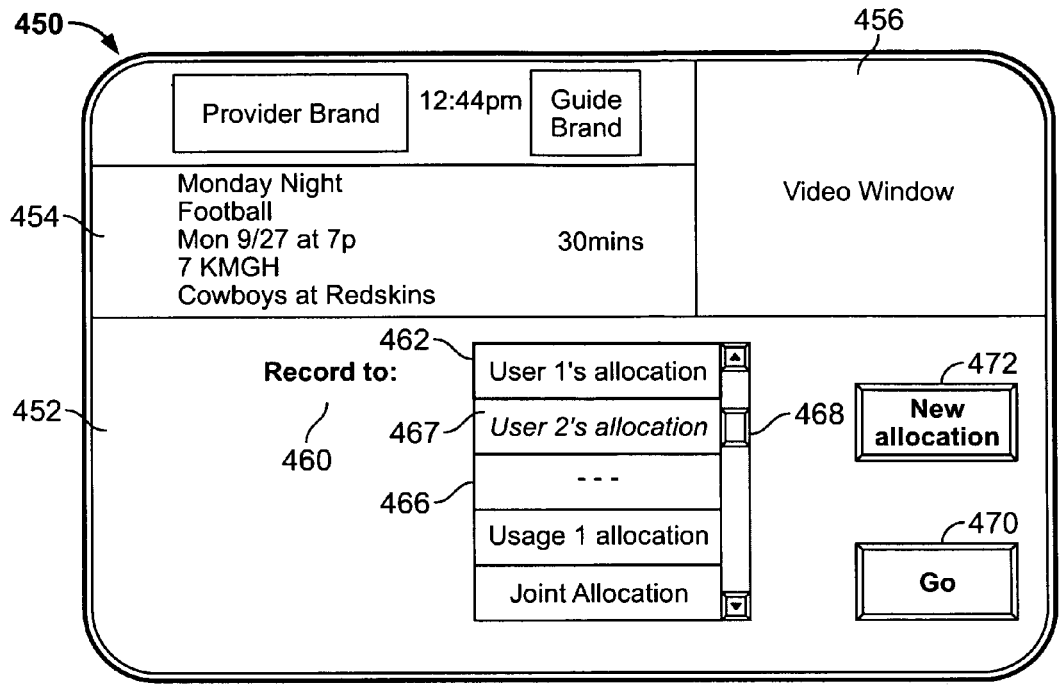
FIG. 4B is an illustrative display of a recording options screen for selecting an allocation to which a recording is assigned in accordance with one embodiment of the invention.

Once the user has selected a user ID and entered the appropriate password (if required), the user may direct the interactive media guidance application to login the user. For example, the user may press a SELECT or ENTER key or key sequence on input mechanism 114, select on-screen GO option 230, or use any other suitable approach for providing a login instruction. If the user is new to the media system, the user may select a "New user" option (e.g., on-screen NEW USER option 232) to register. The interactive media guidance application may prompt the new user to provide a user ID, a password, preference information, or any other suitable information. In some embodiments, the user may log into a specific "usage" account (e.g., a "world news" usage account set up for content related to world news). In some embodiments, the user, once logged-in, may be provided with a "record to" option for selecting a user or usage account to which to record content (e.g., as shown in FIG. 4B).

Figure 3:
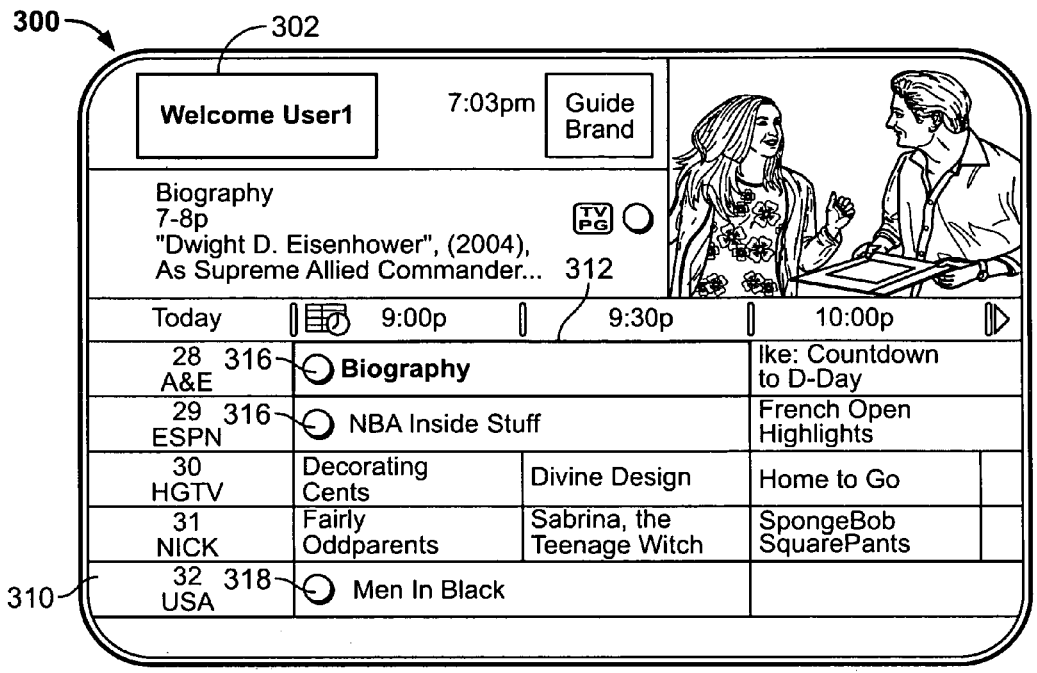
FIG. 3 is an illustrative display screen showing television listings in accordance with one embodiment of the invention.

FIG. 3 is an illustrative display screen showing television listings in accordance with one embodiment of the invention. The user may access interactive media guidance application screen 300 by any suitable means such as, for example, pressing a MENU, GUIDE, or other suitable key or key sequence on user input device 114, navigating from another interactive media guidance application screen or menu, or by any other means known in the art. In multi-user systems, the interactive media guidance application may identify the currently logged in user (e.g., the user whose personalized screens and interactive media guidance application features are provided) using any suitable approach, including for example an on-screen identification (e.g., box 302).

Illustrative interactive media guidance application screen 300 includes a grid of program listings 310, which includes program titles, channels and scheduled broadcast times. The screen may include any other suitable program information. In some embodiments, the interactive media guidance application screen may include a list (i.e., a single column) of programs. The user may select a desired program listing with highlight region 312 using user input 116 (FIG. 1), or any other suitable means.

To schedule a program or other suitable video for recording, a user may highlight a desired program, as shown in FIG. 3 where "Biography" on channel 28 is highlighted, and press a RECORD key or key sequence, or select a RECORD option from the screen using user input device 114 (FIG. 1). Any suitable device from user equipment 110 (FIG. 1), for example recording device 118 (FIG. 1), may record the program. Alternatively, the program may be recorded by any other suitable device that is not part of user equipment 110. In response to receiving an instruction to record the program, the interactive media guidance application may place icon 316 on the listing associated with the selected program to indicate to the user that the interactive media guidance application has scheduled the program for recording (e.g., in FIG. 3, Biography, NBA Inside Stuff and Men In Black are scheduled for recording). In some embodiments, the interactive media guidance application may visually differentiate recordings scheduled by other users, joint allocations, or other usages (e.g., using different icons 316). For example, icon 318 may be a different color than icons 316 (e.g., grayed-out instead of colored) to indicate that another user directed the interactive media guidance application to perform the "Men in Black" recording. In some embodiments, the interactive media guidance application may not identify recordings scheduled by other users.

Prior to choosing to record a program, the user may request additional information regarding the program. For example, the user may highlight a listing using highlight region 312 and press an INFORMATION key or key sequence on user input device 114. In response to receiving the user request, the interactive media guidance application may display an information screen. FIG. 4A is an illustrative display of an information screen in accordance with one embodiment of the invention. Information screen 400 includes detailed information section 402, program description area 404 (including the program title, time and channel), and video window 406. Screen 400 also includes selectable icons 410, some or all of which may include text descriptions. The screen may include options for recording, series recording, parental lock, or any other suitable interactive media guidance application action. If a user determines that he wants to record the program, the user may schedule the recording by pressing a RECORD key or key sequence, selecting a RECORD option from the screen using a user input device (e.g., user input device 114, FIG. 1), or by any other suitable means.

Figure 5:
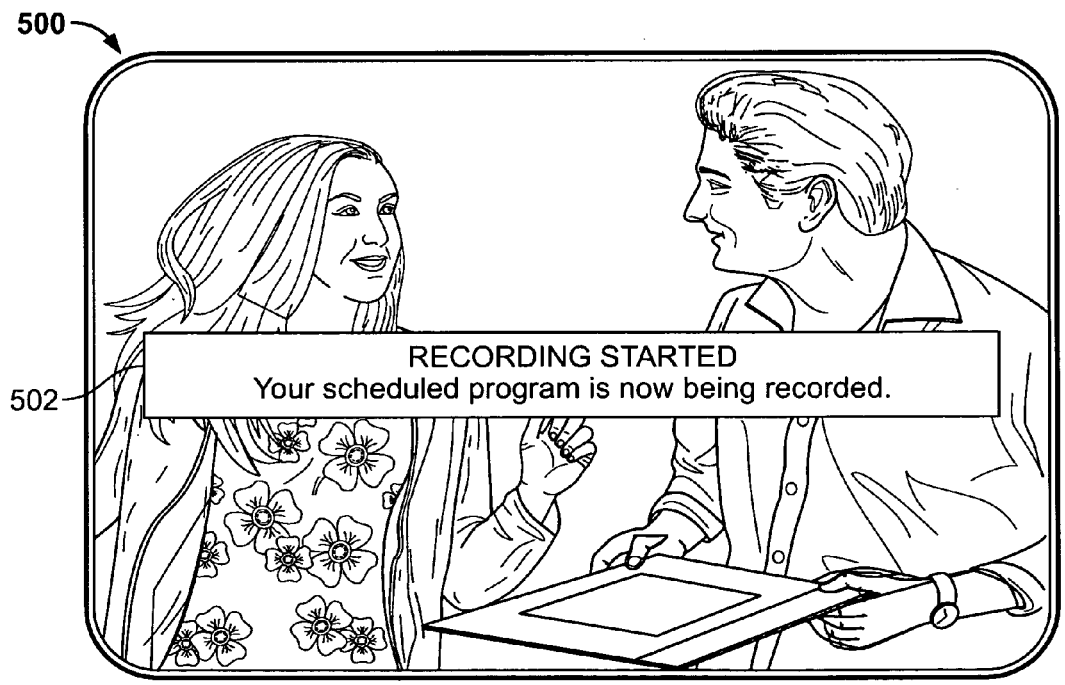
FIG. 5 is an illustrative display screen of a television program in full screen after a recording has commenced in accordance with one embodiment of the invention.

In some embodiments, the user may be watching a program on display device 112 (FIG. 1) in a full screen view, for example full screen view 500 shown in FIG. 5, and decide to record the program. To record the program, the user may press a RECORD key or key sequence on user input device 114 (FIG. 1), or use any other suitable means. A pop-up notice, such as pop-up notice 502, may appear to confirm that recording has begun. Such a notice may also appear in response to receiving a user confirmation to record the program). In some embodiments, pop-up notice 402 may appear automatically when a previously-scheduled recording commences.

In some embodiments, the user may select a particular allocation to which to record a program. FIG. 4B is an illustrative display of a recording options screen for selecting an allocation to which a recording is assigned in accordance with one embodiment of the invention. Screen 450 includes recording option area 452, program description area 454 (including the program title, time and channel) and video window 456. Recording option area 452 may include tag 460 identifying an allocation to which to record selected media. For example, tag 460 may direct the user to select an allocation for the media identified in program description area 454. The user may select an allocation using menu 462. For example, menu 462 may include a drop-down menu having several options 466 listing the allocations available to the user. The user may scroll through options 466 using arrows and slider 468.

Options 466 may include some or all of the allocations available to which recordings may be assigned. In some embodiments, the interactive media guidance application may limit the options displayed based on the user currently logged in or on the usage of the content selected for recording. For example, if User 1 is currently logged in, options 466 may not include the allocations associated with other users. As another example, if the usage of the selected content is Usage 1, options 466 may not include other usages. As still another example, options 466 may only include joint allocations that are associated with the current user or with the usage of the selected content. In some embodiments, options 466 may include some or all of the other allocations not available for the selected content (e.g., a joint allocation that includes users other than User 1). To identify allocations as not being available, the options may be displayed with a different font (e.g., italics 467), background or font color (e.g., grayed out), icon, or any other suitable identification.

The user may enter an allocation in menu 462 using any suitable approach. In some embodiments, the user may select allocations from a pop-up menu, different screen, or other suitable listing of allocations. In some embodiments, the user may enter an allocation using an input device (e.g., enter a user ID to select the user allocation associated with that user ID). In some embodiments, the user may create a new allocation if none of the existing allocations is suitable (e.g., a guest allocation). For example, the user may select a new allocation option 472.

Once the user has selected an allocation in menu 462, the user may provide the selection to the interactive media guidance application using Go option 470. If the user selected an allocation which is not associated with either the user or the usage of the selected content, the interactive media guidance application may display a log-in screen (e.g., screen 200, FIG. 2) to prompt the user for authorization to access the selected allocation. If the user cannot provide authorization to the interactive media guidance application (e.g., the user does not know a password), the interactive media guidance application may prompt the user to select another allocation.

Figure 6:
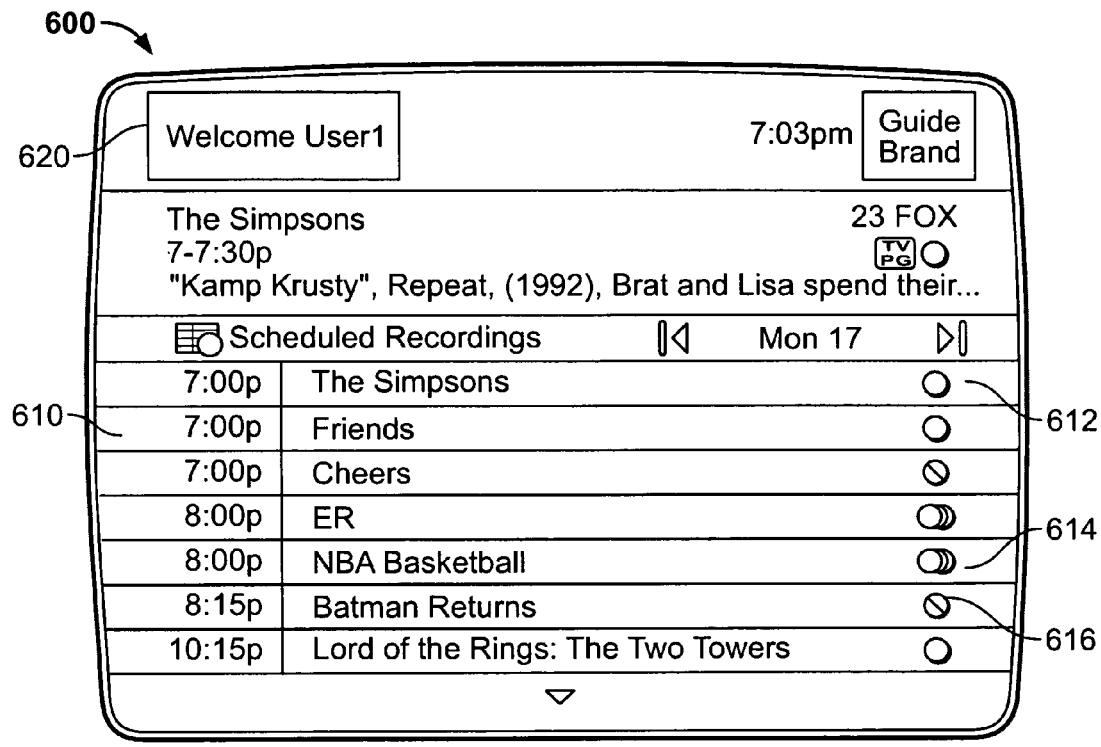
FIG. 6 is an illustrative display of a scheduled recordings screen in accordance with one embodiment of the invention.

The user may view the scheduled recordings using any suitable approach. For example, the user may access a scheduled recordings screen. FIG. 6 is an illustrative display of a scheduled recordings screen in accordance with one embodiment of the invention. Screen 600 may include listings 610 of scheduled recordings. The interactive media guidance application may display listings 610 in any suitable manner, including for example by time (e.g., in the y-direction) and by day (e.g., in the x-direction). In some embodiments, the interactive media guidance application may display listings 610 by channel, by program, by rating, or by any other suitable criteria. The interactive media guidance application may indicate the type of recording (e.g., series or one-time) using on-screen icons 612 and 614, respectively. In some embodiments, scheduled recordings screen 600 may visually differentiate recordings scheduled by other users, by joint allocations, or by other usages (e.g., using different fonts, different font or background colors, or different icons 612).

In some embodiments, the interactive media guidance application may indicate that a recording will not be performed (e.g., due to a resource conflict). For example, the interactive media guidance application may display an on-screen icon (e.g., icon 616) indicating that a recording will not be performed. In some embodiments, the interactive media guidance application may list recordings that will not be performed in a separate listing, or not list the recordings at all. In some embodiments, a key or explanation dialog may be provided describing why a recording may not be recorded (e.g., recording is over the user's allocation, or recording is over the flex limit).

Display screen 600 may include scheduled recordings for one or more users. For example, display screen 600 may include only the recordings scheduled by the particular user currently logged in (e.g., identified in box 620). As another example, display screen 600 may include the recordings scheduled by every user. As still another example, the interactive media guidance application may allow the user to view the scheduled recordings of a subset of the users (e.g., the particular user selects whose scheduled recordings to see, or the interactive media guidance application may only allow the particular user to view scheduled recordings of users having lower priority, the user's own recordings and those within joint allocations or usage groups to which the user belongs).

The recording device may record a selected program by tuning to the channel or selecting the transport stream of the selected program, and recording all of the media that is transmitted on the channel or transport stream during the scheduled transmission time of the program. The recording device may be located in the user's equipment (e.g., a DVR), or may be a remote server to which the interactive media guidance application has access (e.g., network DVR). The recorded media may thus include the selected program, and advertisements displayed during breaks in the program (e.g., during commercial breaks of a sporting event, or every 10 or 15 minutes of a series).

In some embodiments, the recording device may be configured to cache the programs that the user views. For example, the recording device may be configured to cache only specific channels (e.g., favorite channels), or the recording device may be configured to cache the channel that the user is watching. The cached programs may be available for playback using trick-play instructions (e.g., pause, rewind, fast forward). If an entire program is stored in a cache, the recording device may save the cached program as a recording. For example, if the user tunes to a channel at the beginning of a program (where the channel is cached as soon as the user tunes) and decides to record the program half way through, the entire program may be recorded because the cache contains the entire program up to the point that the user made the recording decision.

Once the recording device has recorded selected programs, the user may direct the interactive media guidance application to display listings of the recordings that the user may select for playback. For example, the user may access a recordings menu by pressing a RECORDINGS key or key sequence, navigating from another interactive media guidance application screen (e.g., selecting a RECORDINGS option from an interactive media guidance application screen using user input device 114, FIG. 1), or by any other suitable means.

Figure 7:
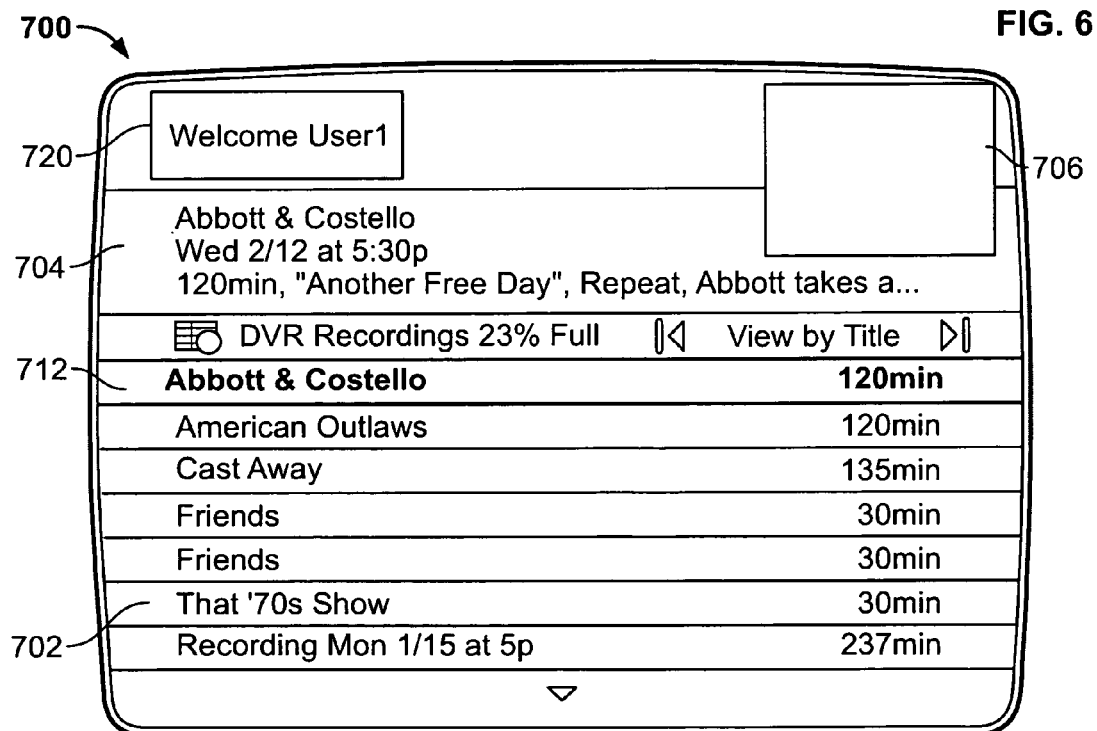
FIG. 7 is an illustrative display screen of recorded recordings in accordance with one embodiment of the invention.

Recordings menu 700, shown in FIG. 7, is an illustrative display of listings of recordings performed by the media system. Menu 700 may include any suitable recording listings, including for example only the recordings scheduled by the user, recordings scheduled by all of the users, or recordings scheduled by only some users (e.g., users having lower rights than the current user such as the user's children). Menu 700 includes recordings listings 702, detailed information section 704 and video window 706. Listings 702 include the program title and program length. The listings may include any other suitable information (e.g., channel number or date recorded). In some embodiments, menu 700 may include listings for cached programs and listings for programs stored remotely that do note use any portion of the local storage (e.g., VOD programs), or such programs may be listed on additional, separate screens.

In some embodiments, display screen 700 may include recordings performed for one or more users. For example, display screen 700 may include only the recordings performed for the particular user currently logged in (e.g., identified in box 720). As another example, display screen 700 may include the recordings performed for every user. As still another example, the interactive media guidance application may allow the user to view the recordings performed for a subset of the users (e.g., the recordings performed for only those users having lower priority than the current user).

Screen 700 may indicate to the user the amount of storage space taken by the recordings. For example, the interactive media guidance application may display an indication of how much of the user's allocation has been used (e.g., how much space the user has remaining under the user's storage limit). In some embodiments, the user may view the recording device resource use of other users. As another example, the interactive media guidance application may display an indication of how much of the total space available on the recording device has been used. In some embodiments, the interactive media guidance application may display to the user (e.g., on screen 700) an indication of whether a user's storage limit may be flexibly increased (e.g., as described below).

To play back a recording, the user may select the listing (e.g., using highlight region 712) associated with the recording from listings 702 and press a PLAY key or key sequence on the user input device, select a play option from an interactive media guidance application screen, or perform any other suitable step to initiate playback. The user may alternatively press an INFORMATION key or the like to cause an information screen to be displayed (such as information screen 400 of FIG. 4A) and select a PLAY icon from the information screen. In response to the user request, the interactive media guidance application may direct the user's equipment to play back the recording by, for example, directing the recording device (e.g., recording device 118) to provide the appropriate video and audio streams to a decoding device, which may provide decoded video and audio to a display device (e.g., display device 112) to display the selected recording. In some embodiments, users may be authorized to playback only some of the recordings (e.g., only the recordings scheduled by the user, or recordings scheduled by users having lower rights). In some embodiments, users may be authorized to play back all of the recordings.

The storage space of the recording device may be allocated among the users of media system 100 (FIG. 1) using any suitable approach. For example, recording device 118 (FIG. 1) may allocate the storage space to several users of recording device 118. As another example, an interactive media guidance application implemented on media system 100 may allocate storage space of recording device 118 to several users of media system 100 (e.g., the interactive media guidance application may control whether requested recordings are performed based on the recording device resource allocation that is controlled by the interactive media guidance application). Although the following discussion will describe embodiments of the invention in which the interactive media guidance application is operative to allocate and manage the recording device resources, it will be understood that any other suitable component or application of media system 100 may be used.

Figure 8:
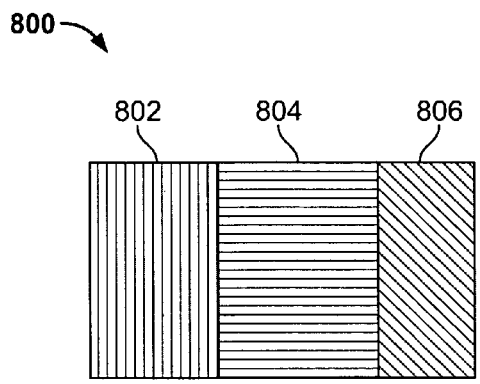
FIG. 8 is a schematic display of storage space distributed between users in accordance with one embodiment of the invention.

The interactive media guidance application may use any suitable approach to allocate storage space to each user. For example, the interactive media guidance application may identify blocks of storage space (e.g., chunks of memory), and assign one or more blocks to each user. The interactive media guidance application may allocate physical blocks of memory (e.g., allocated blocks based on their physical location in memory), or allocate an amount of memory defined by the size of a block (e.g., independent of the underlying physical location of the block). FIG. 8 is a schematic display of storage space distributed between users in accordance with one embodiment of the invention. Storage space 800 may be divided into blocks 802, 804 and 806, where each of the blocks is allocated to a different user. Each of blocks 802, 804 and 806 may identify blocks of memory based on the underlying physical location in memory, or may represent particular amounts of storage space available to each user. In some embodiments, storage space 800 may be divided into any suitable number of blocks, including for example as many blocks as there are users using the media system. The interactive media guidance application may define the size of blocks 802, 804 and 806 by assigning a storage space limit to each user, which may be selected using any suitable approach. For example, the interactive media guidance application may assign the same storage space limit to each user. As another example, the interactive media guidance application may assign different storage space limits to different users based on any suitable criteria. Such criteria may include, for example, user priority (e.g., parents have a higher priority than children or guests), user seniority, device used by the user, user's recording habits, user's viewing habits, or any other suitable criteria. In some embodiments, the interactive media guidance application may allocate all of the available storage space, or the interactive media guidance application may instead save some storage space for new users or uses other than recording media. The following discussion will refer interchangeably to storage limits and storage space. It will be understood that any of the approaches described for allocating storage space may be used in each embodiment.

When a user reaches his storage space limit, the interactive media guidance application may require the user to delete media stored in the user's storage space to make room for additional recordings. For example, the interactive media guidance application may automatically delete media with low priority (e.g., low assigned priority, previously watched recording, or media that can easily be re-recorded) to make room for a higher priority new recording. As another example, the interactive media guidance application may prompt the user to delete previously recorded media when the user sets up the new recording. In such embodiments, the block of storage in the recording device defined by the user's storage space limit may be treated as an independent recording device.

In some embodiments, the interactive media guidance application may define flexible storage space limits to take advantage of unused recording device resources when a user reaches or exceeds the user's storage space limit. The interactive media guidance application may initially assign a flexible storage space limit to each user. When a first user provides an instruction that would cause the first user to exceed his flexible storage space limit (e.g., request that recording device 118 record media that is larger than the remaining storage space available to the user), instead of or in addition to deleting recorded media to create sufficient space in the first user's storage space, the interactive media guidance application may determine whether one or more other users have sufficient space to accommodate the recording request. If the interactive media guidance application identifies one or more users having unused space, the interactive media guidance application may flexibly increase the first user's space limit to permit the recording of the requested media using the identified unused space.

In some embodiments, the other user from whom storage space was borrowed to accommodate the first user's recording may not be made aware that his storage space was reallocated. Instead, when the user wishes to use the reallocated storage space, the interactive media guidance application may return the reallocated storage space to the other user to allow the other user to perform requested recordings. The first user, borrowing the storage space, may be informed of the risk of borrowing storage space (e.g., a request to return it may come at any time) when the recording is scheduled. In some embodiments, the interactive media guidance application may instead decrease the other user's storage limit to accommodate the first user's request for more storage space. In such an embodiment, the other user may be made aware of the decrease in his storage space. In some embodiments, if the interactive media guidance application determines that storage space cannot be borrowed from other users (e.g., no storage space available, or other users have a higher priority), the interactive media guidance application may prevent the first user from performing the recording without deleting previously recorded media.

Figure 9:
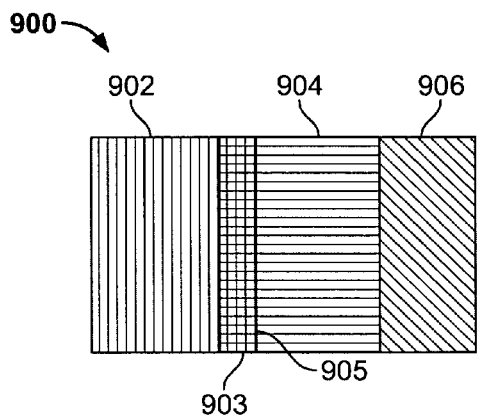
FIG. 9 is a schematic display of storage space flexibly distributed among users in accordance with one embodiment of the invention.

FIG. 9 is a schematic display of storage space flexibly distributed among users in accordance with one embodiment of the invention. Storage space 900 may be divided into blocks 902, 904 and 906, which may correspond to blocks 802, 804 and 806 of FIG. 8. To flexibly increase the storage limit associated with the user of block 902, the interactive media guidance application may re-allocate sub-block 903 from block 904 to block 902. The limit between blocks 902 and 904 may then become line 905. In some embodiments, the allocation associated with block 904 may or may not be shown to the user (e.g., in the GUI displayed to the user) as having been decreased. If the allocation of block 904 is shown as having remained constant, the media guidance application may automatically delete content from expanded block 902 to return sub-block 903 to block 904 when the space is needed, without changing the size of the allocation displayed to the user.

Figure 10:
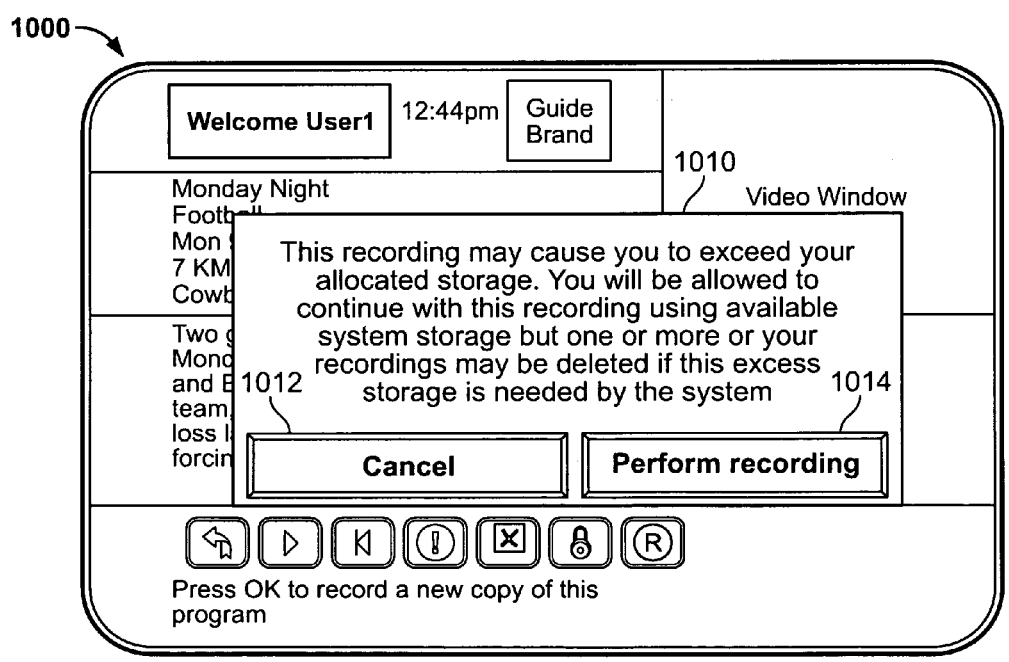
FIG. 10 is an illustrative display screen for informing the user that a newly scheduled recording may exceed the user's allotted storage limit in accordance with one embodiment of the invention.

FIG. 10 is an illustrative display screen for informing the user that a newly scheduled recording may exceed the user's assigned storage limit (e.g., exceed the user's allocated storage space) in accordance with one embodiment of the invention. Display screen 1000 includes pop-up window 1010, which may include a message related to the recording device resources available to the user. For example, window 1010 may include a message indicating to the user that scheduling the recording will cause the user's storage limit to flexibly increase, which may put some of the user's recordings at risk (e.g., when or if the space taken by the additional recording is returned to its initial owner). Although a pop-up window 1010 is used in screen 1000, it will be understood that any other approach may be used to provide any appropriate message for the situation to the user (e.g., a new page, or displaying the message in a portion of the screen).

In response to the message of window 1010, the user may select to either proceed with the new recording (e.g., and use storage beyond their specified storage limit), or cancel the new recording. The user may select whether to proceed or cancel the recording using any suitable approach. For example, the user may cancel the recording by selecting on-screen CANCEL option 1012, pressing a CANCEL key or key sequence on the input device (e.g., input device 114, FIG. 1), or by using any other suitable approach. As another example, the user may proceed with the recording by selecting on-screen PROCEED option 1012, pressing a PROCEED key or key sequence on the input device (e.g., input device 114, FIG. 1), or by using any other suitable approach.

In some embodiments, screen 1000 may be used when the user's flexible storage limit cannot be increased. In such cases, window 1010 may inform the user that a past recording must be deleted before the new recording can be performed. The user may then, in response to the prompt of window 1010, cancel the scheduled recording, or access a recordings screen (e.g., recordings menu 700, FIG. 7) to delete past recordings. In the absence of a user instruction, the interactive media guidance application may perform any suitable action, including for example canceling the new recording, or automatically deleting a past recording to make room for the new recording (e.g., using a priority scheme).

After proceeding with or canceling the recording, the user may delete one or more recorded programs to reduce the amount of recording device storage space used by the user (e.g., to avoid the interactive media guidance application automatically deleting programs to keep the user within the user's flexible storage limit). In some embodiments, deleting recorded programs may allow the interactive media guidance application to return the user's flexible storage limit to its initial, non-increased value.

When one of the one or more other users (whose storage space was used by a first user) wishes to record media that would require the storage space borrowed by the first user, the interactive media guidance application may determine whether the storage space borrowed by the first user can be returned or whether the storage space borrowed by a second user, different than the first, might be better suited for return. In some embodiments, the interactive media guidance application may choose to return storage borrowed by the second user over that storage used by the first user if the storage borrowed by the second user was borrowed earlier than the storage borrowed by the first user, or vice versa.

In some embodiments, the interactive media guidance application may determine whether the storage space allocated to a third user can be borrowed by the other user. For example, the interactive media guidance application may determine whether the third user is storing media that has a lower priority than the new scheduled recording of the other user. As another example, the interactive media guidance application may determine whether the third user has a lower priority than the user whose storage space was previously lent to the first user.

FIG. 11 is a schematic display of an illustrative data structure for storing the media system users' storage limits in accordance with one embodiment of the invention. Data structure 1100 includes several columns 1110 identifying types of information stored, and several rows 1120, each associated with a particular user. The data stored in column 1112 identifies the user of the media system. For example, entries 1122a and 1122n may include user identification information, such as the user's login ID, a unique identifier assigned to each user by the media system (e.g., media system 100), or any other suitable user identification information.

The data stored in column 1114 identifies the current space allocation of each user. For example, entries 1124a and 1124n may include a measure of the storage space allocated to the user associated with the row of the respective entry. Entries 1124a and 1124n may include any suitable data defining the user's current storage allocation. For example, entries 1124a and 1124n may include a percentage of total storage space, the quantity of memory (e.g., in MB), the number of data blocks, the hours of video storage (e.g., at SD or HD rates), the identity of the data blocks, combinations of these, or any other suitable data operative to define the amount of storage space currently allocated to each user.

The data stored in column 1114 identifies the current storage space used by each user. For example, entries 1126a and 1126n may identify the amount of space taken by each of the recordings that the interactive media guidance application directed the recording device to perform on behalf of the user associated with the row of the respective entry. Entries 1126a and 1126n may identify the amount of space taken using any suitable approach, including for example, as a percentage of the user's current storage space allocation, a percentage of the total space available, the quantity of memory used (e.g., in MB), the number of data blocks, combinations of these, or any other suitable data operative to define the current amount of storage space used. The data in entries 1126a and 1126n may identify particular recordings and the amount of storage space taken by each recording (e.g., in a separate data structure, such as a table). Then, when a particular recording is deleted, the interactive media guidance application may modify the data stored in entries 1126a and 1126n to remove the reference to the particular recording and decrease the current amount of storage space used by the amount associated with the deleted recording.

In some embodiments, data structure 1100 may include column 1118, identifying each user's storage space allocation prior to a flexible extension. For example, entries 1128a and 1128n of column 1118 may include data defining each user's storage space allocation when the interactive media guidance application (e.g., under the direction of a super-user or algorithmically) initially distributed storage space among the users. The data stored in entry 1128a and 1128n may include any of the types of data stored in column 1114, described above. In some embodiments, the interactive media guidance application may actively seek to modify the current space allocations of entries 1124a and 1124n to match the initial space allocations identified in entries 1128a and 1128n (e.g., to ensure an equitable division of storage space). The interactive media guidance application may seek to modify current space allocations by providing regular reminders to those users that have exceeded their initial allocations informing those users they are over their limit and should seek to reduce their amount of storage used. In some embodiments, storage may be recovered only when it is needed by the user from whom it was borrowed.

In some embodiments, data structure 1100 may be used to store the media system's usage storage limits. For example, column 1112 may include identification information for one or more usages. In embodiments where the storage space is allocated to both a user and a usage, column 1112 may include identification information for both the user and the usage. Alternatively, column 1112 may include either a usage or a user.

In some embodiments, the interactive media guidance application may intelligently allow users to borrow additional space from other users or usages, thus effectively temporarily reducing the other users' or usages' available storage space. For example, the interactive media guidance application may predict each user's use of the storage space of the recording device, and allow users to borrow storage space from other users during times that the interactive media guidance application predicts the other users will have free space available.

The interactive media guidance application may predict the expected use of the recording device storage using any suitable approach. In some embodiments, the interactive media guidance application may model expected use of the recording device resources to predict which resources of the recording device will be used at different times. For example, the interactive media guidance application may model expected use based on each user's recording history (e.g., past recordings of particular shows), scheduled recordings, viewing history (e.g., how long after recording a program does the user view and/or delete the program), deleting history, opportunities to re-record media, and any other suitable criteria. Using the modeling, the interactive media guidance application may determine the amount of each user's allocated storage limit that will be free at any particular time. The interactive media guidance application may also determine whether the amount of free space, if borrowed by another user, will be sufficient to perform the other user's requested recording.

The interactive media guidance application may return borrowed storage space to its initial owner at any suitable time. For example, once the user who borrowed space deletes enough media to return the borrowed storage space, the interactive media guidance application may return the borrowed space. As another example, if the interactive media guidance application determines, based on the modeling of expected storage space use (e.g., a future recording is scheduled, or the interactive media guidance application expects a new recording to be scheduled), that the user from whom storage space was borrowed will need the storage space returned, the interactive media guidance application may delete media from the user who borrowed the space (e.g., delete lowest priority programs) to free storage space to be returned. As still another example, the interactive media guidance application may determine that the user actually needs the borrowed storage space to be returned (e.g., the user has scheduled a new recording without deleting a prior recording), and direct the borrowing user to return the borrowed storage space. As still yet another example, the interactive media guidance application may look to the allocation of a user or usage other than the borrower for available space, and allow the original borrower to return his borrowed storage space to the other user or usage.

In some embodiments, the interactive media guidance application may jointly allocate storage space to several users who share a single asset. For example, if several users direct the interactive media guidance application to record the same media, the interactive media guidance application may record the media only once, but assign or assess a portion of the storage space taken by the media to one or all of the several users. As another example, if a user directs the interactive media guidance application to record media that has previously been recorded per the instructions of another user, the interactive media guidance application may not record the media a second time, but instead readjust the assignment or assessment of the storage space allocated to each of the two users, in some cases dividing the assessment between both users. In some embodiments, the reassessment may be associated with an adjustment of deletion rights.

The interactive media guidance application may jointly allocate storage for shared media using any suitable approach. In some embodiments, the interactive media guidance application may attribute equal portions of the storage spaced used to each user (e.g., 1/x of the recording is assessed to each user's storage space when x users share the recording). In some embodiments, the interactive media guidance application may instead attribute different portions to each user. For example, the interactive media guidance application may attribute portions of the used storage space based on each user's storage limit, the amount of storage space available to each user, the priority each user assigned to the media, when the user directed the interactive media guidance application to record the program, the priority of each user, or any other suitable criteria for attributing portions of the used storage space to each user.

Figure 12:
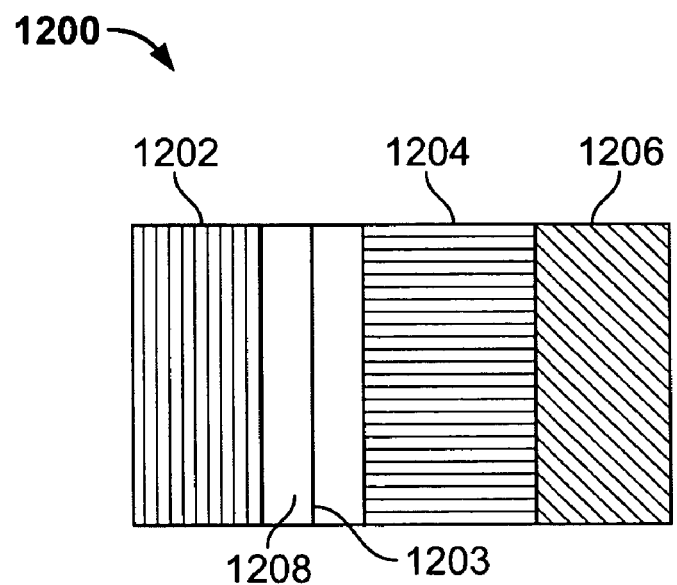
FIG. 12 is a schematic display of storage space jointly allocated among users in accordance with one embodiment of the invention.

FIG. 12 is a schematic display of storage space jointly allocated among users in accordance with one embodiment of the invention. Storage space 1200 may be divided into blocks 1202, 1204 and 1206, which may correspond to blocks 802, 804 and 806 of FIG. 8. The interactive media guidance application may jointly allocate a recording between block 1202 and 1204 by storing the recording simultaneously in both blocks. For example, a recording stored in sub-block 1208 may be simultaneously stored in blocks 1202 and 1204 (e.g., separated by line 1203). The interactive media guidance application may distribute any suitable amount of sub-block 1208 in each of blocks 1202 and 1204.

When a user directs the interactive media guidance application to delete shared media, the interactive media guidance application may modify the joint allocation to include only the users who continue to retain the shared media. If only one user is left retaining the media, the interactive media guidance application may allocate the entirety of the storage space used for the media to the remaining user's storage space. If the storage limit of a remaining user is not high enough for the user to store the media in the allocated storage space, the interactive media guidance application may use any suitable approach to determine whether or not to delete the media. For example, the interactive media guidance application may attempt to increase the user's flexible storage limit, may borrow storage space from another user, or may delete other media from the user's allocated storage space to accommodate the shared media. If the interactive media guidance application determines that the user should delete the shared media in favor of other recorded media, the interactive media guidance application may remove the user's joint allocation of the shared media (e.g., and delete the media if the user is the last one associated with the media).

In some embodiments, the storage space available on the recording device (e.g., on recording device 118) may, instead of or in addition to being allocated by user, be allocated by usage. For example, the interactive media guidance application (or the recording device) may allocate different blocks of storage space based on the type of media recorded (e.g., self-improvement or entertainment), genre, actor, producer, rankings, ratings (e.g., Nielson ratings), channel, time transmitted, media source (e.g., broadcast, cable, satellite, or on-demand), or any other suitable usage category.

Users may direct the recording device to record media that has any suitable usage. The interactive media guidance application may then associate the recorded media with the storage space allocated to the usage of the recorded media. A usage storage limit may be associated with each usage to specify the amount of storage space available to each usage. In some embodiments, the usage storage limit may be fixed (e.g., a hard limit of set aside storage).

In some embodiments, the usage storage limit may be flexible and may include some or all of the features of the flexible storage limit described above in connection with associating flexible storage limits to different users. In some embodiments, the interactive media guidance application may allow intelligent borrowing from the storage space of other usages. The intelligent borrowing may include some or all of the features of intelligent borrowing described above in connection with intelligent borrowing of storage space allocated to different users. In some embodiments, the interactive media guidance application may jointly allocate recorded media to two or more usages. The joint allocation may include some or all of the features of joint allocation described above in connection with joint allocation of media to several users.

In some embodiments, the interactive media guidance application may associate priorities with each usage. The priorities may then be used to determine the amount of storage space associated with each usage. For example, the priorities may be used to define usage storage limits for each usage (e.g., a high priority usage and a medium priority usage are translated as a usage storage limit of 60% of the available storage for the high priority usage, and a usage storage limit of 40% of the available storage for the medium priority usage). In some embodiments, the relative priorities of each usage may be used to resolve conflicts when insufficient storage space remains to perform a recording. For example, if a high priority usage overflows into storage space initially allocated to a lower priority usage (e.g., using flex limits) and media belonging to the lower priority usage is scheduled for recording, the interactive media guidance application may sometimes delete media having a higher priority usage to allow the media scheduled for recording to be recorded (e.g., high priority media is retained 60% of the time, and new lower priority media is recorded the remaining 40% of the time). The interactive media guidance application may associate any suitable percentages with each relative priority level.

In some embodiments, the interactive media guidance application may assign priorities to individual recordings stored in each usage storage block. For example, newer recordings may have a higher priority than older recordings within a usage. As another example, the interactive media guidance application may assign a higher priority to media with higher rankings or ratings (e.g., assign a high priority to a popular recorded video).

In some embodiments, the interactive media guidance application may set aside portions of storage space of the recording device for particular uses. For example, the interactive media guidance application may set aside a portion of storage space for one or more particular users (e.g., each high priority user is exclusively allocated 15% of the storage space). As another example, the interactive media guidance application may set aside a portion of storage space for one or more particular usages (e.g., set aside 30% of the storage space for educational programs used by one or more users for work, or set aside 10% of the storage space for highly-rated media). As still another example, the interactive media guidance application may set aside a portion of storage space for several users, usages, or both jointly (e.g., a jointly allocated set aside). The remaining storage portions of the recording device may be unallocated, allocated to different usages, users or both, and subject to flexible storage limits, intelligent borrowing, joint allocations, or any other storage management approach.

Figure 13:
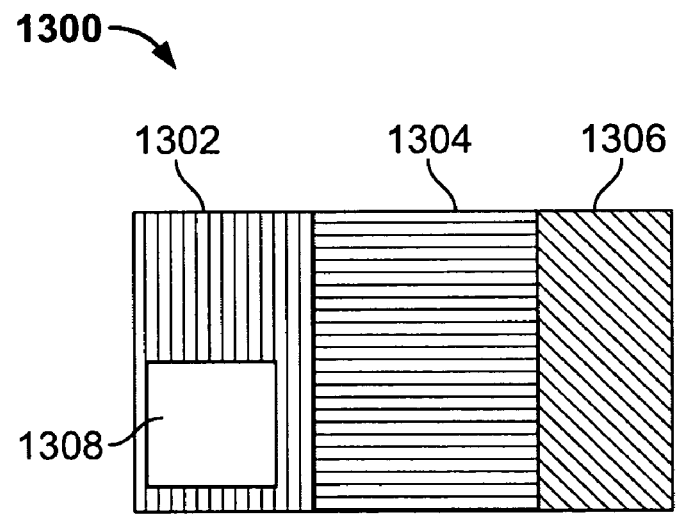
FIG. 13 is a schematic display of storage space jointly allocated among users or usages in accordance with one embodiment of the invention.

FIG. 13 is a schematic display of storage space jointly allocated among users or usages in accordance with one embodiment of the invention. Storage space 1300 may be divided into blocks 1302, 1304 and 1306, which may correspond to blocks 802, 804 and 806 of FIG. 8. A portion of block 1302 may be set-aside for an exclusive use. For example, sub-block 1308 may be set aside for a particular user or for a particular usage.

A user may be required to provide a specific instruction to access a set aside storage portion. The set aside storage portions may be protected by a password. A user may be required to enter the correct password to record media in the set aside storage portion, delete media from the set aside storage portion, move recorded media to or from the set aside storage portions, combinations of these, or any other suitable action involving the set aside storage portion. If the user does not provide the proper password, the interactive media guidance application may prevent the user from accessing the set aside storage portion. Alternatively, a set-aside storage portion may be restricted to a scope of use that is enforced by the system once the scope has been established by a super-user of the system. For example, a set aside may be designated as only for biographies or only for content from news channels. In some embodiments, content that meets a set-aside storage areas criteria may be automatically assigned by the system to the set-aside storage portion.

Figure 14:
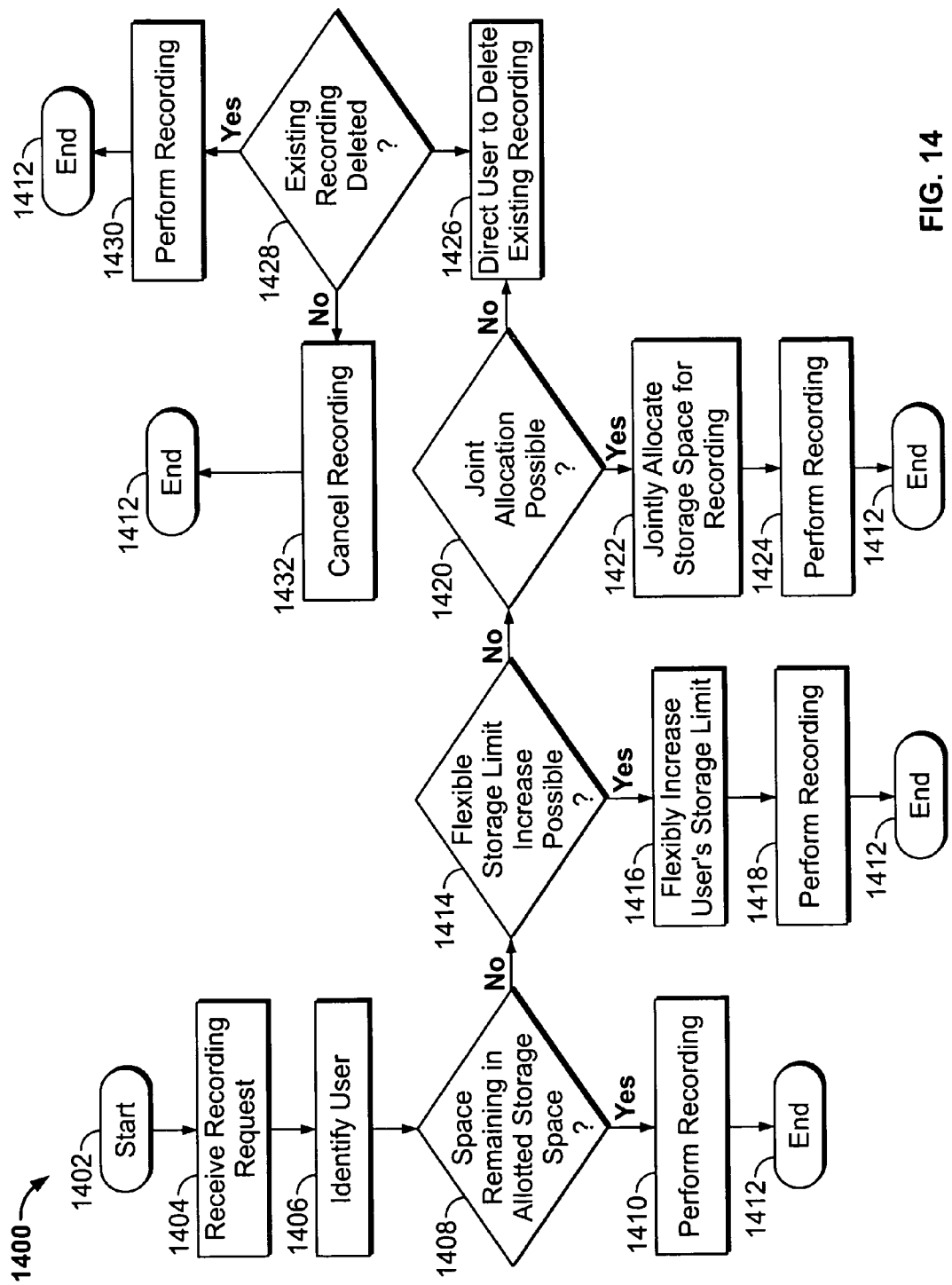
FIG. 14 is a flow chart of an illustrative process for managing storage space in response to a user's request to perform a recording in accordance with one embodiment of the invention.

The following flow charts serve to illustrate processes involved in some embodiments of this invention. It will be understood that the order of steps in the processes described below is merely illustrative, and that any suitable order may be used. FIG. 14 is a flow chart of an illustrative process for managing storage space in response to a user's request to perform a recording in accordance with one embodiment of the invention. Process 1400 begins at step 1402. At step 1404, the interactive media guidance application receives a recording request. For example, the interactive media guidance application may receive an input from input device 114 (FIG. 1), and direct control circuitry 116 (FIG. 1) to schedule a recording using recording device 118 (FIG. 1). As another example, the interactive media guidance application may automatically schedule a recording (e.g., automatically record programs of interest to the user). At step 1406, the interactive media guidance application identifies the user providing the recording request. For example, the interactive media guidance application may identify the user for whom the recording is performed based on user log-in information, deductions from the user's viewing history, or the user associated with the current time in an embodiment that automatically associates users with periods of the day based on historical profile trending. In some embodiments, process 1400 may instead or in addition identify the usage associated with the requested recording. In such embodiments, references to the user requesting the recording in process 1400 and other processes described below may be understood to be references to the usage associated with the recording.

At step 1408, the interactive media guidance application determines whether space remains in the storage space allotted to the user identified at step 1406. For example, the interactive media guidance application may determine the storage limit (e.g., the maximum storage available to the user on recording device 118) associated with the user, and determine the difference between the current amount of used storage space and the user's storage limit. The interactive media guidance application may then compare the determined amount of storage space available with the expected amount of storage space required to perform the recording requested at step 1404. For example, the interactive media guidance application may predict the amount of storage space needed based on the length of the recording, the quality of the recording, the media source (e.g., regular or high definition), or any other suitable criteria. If the interactive media guidance application determines that the recording device has sufficient space remaining that is allocated to the user to perform the recording, process 1400 moves to step 1410.

At step 1410, the interactive media guidance application performs the requested recording. For example, the interactive media guidance application may direct recording device 118 to record the media selected at step 1404 when it is transmitted to user equipment 110 (FIG. 1). Process 1400 then ends at step 1412.

If, at step 1408, the interactive media guidance application instead determines that the recording devices does not have sufficient space remaining that is allocated to the user to perform the recording, process 1400 proceeds to step 1414. At step 1414, the interactive media guidance application determines whether it is possible to increase the flexible storage limit associated with the user. For example, the interactive media guidance application may determine whether there is sufficient space allocated to another user of recording device 118 to provide additional space to the user requesting the recording. As another example, the interactive media guidance application may determine whether the user can borrow storage space from one or more other users based on the expected storage space consumption of the one or more other users (e.g., a new recording expected for another user, or does the interactive media guidance application expect another user to delete an existing recording to create more room in the recording device).

In some embodiments, the interactive media guidance application may model expected recording device resource consumption for each user to predict how much storage space will be available at a particular time. Using the modeling, the interactive media guidance application may allow intelligent borrowing of storage space, thus selectively increasing and decreasing different users' flexible storage limits (e.g., allow a user to borrow storage space because the interactive media guidance application expects the user to delete an existing recording, thus allowing the user to return the borrowed storage space before it is expected to be needed by its initial owner). If the interactive media guidance application determines that sufficient free space can be taken from one or more other users, and that the user's flexible storage limit may be increased, process 1400 may move to step 1416.

At step 1416, the interactive media guidance application flexibly increases the user's storage limit. For example, the interactive media guidance application may temporarily allocate storage space that initially was associated with one or more other users to the user requesting the recording. As another example, the interactive media guidance application may borrow storage space from another user for allocation to the user requesting the recording. In some embodiments, the interactive media guidance application may display a notice to the user (e.g., in a pop-up window, a new screen, or in a portion of an existing screen such as screen 1000, FIG. 10) informing the user of the increase in the user's flexible storage limit, and of the risk that it may entail (e.g., automatic deletion of recordings when the space taken from other users must be returned). In response to the notice, the user may elect to proceed with the recording, or to cancel the recording. At step 1418, the interactive media guidance application performs the requested recording. For example, the interactive media guidance application may direct recording device 118 to record the media selected at step 1404 when it is transmitted to user equipment 110. In some embodiments, the interactive media guidance application may adjust its memory usage and memory allocation tables in stored memory (e.g., adjust data structure 1100, FIG. 11) to account for the increase in the user's storage space and for the conducting of the recording. Process 1400 then ends at step 1412.

If, at step 1414, the interactive media guidance application instead determines that there is insufficient free space available to be taken from one or more other users to increase the user's flexible storage limit, process 1400 proceeds to step 1420. At step 1420, the interactive media guidance application determines whether the scheduled recording can be jointly allocated between two or more users. For example, the interactive media guidance application may determine whether the user has rights to store content in a joint allocation of which the user is a member. As another example, the interactive media guidance application may determine whether the media selected for recording at step 1404 has been previously recorded by another user with whom the user may share the recording space required to perform the recording. As another example, the interactive media guidance application may determine whether one or more other users have also selected the same media for recording (e.g., at the same transmission time or not). If the interactive media guidance application determines that the media has been selected for recording by at least two users, process 1400 proceeds to step 1422.

At step 1422, the interactive media guidance application jointly allocates the recording to the users who requested it. For example, the interactive media guidance application may allocate the recording equally among the storage blocks associated with the users who requested the recording. As another example, the interactive media guidance application may allocate the recording as a function of the amount of space available to each user in the recording device. As still another example, the interactive media guidance application may allocate the recording as a function of the priority assigned to the recording by each user. The interactive media guidance application may use any other suitable criteria for jointly allocating the recording to the storage space of each user.

At step 1424, the interactive media guidance application performs the requested recording. For example, the interactive media guidance application may direct recording device 118 to record the media selected at step 1404 when it is transmitted to user equipment 110. In some embodiments, the interactive media guidance application may adjust its memory usage and memory allocation tables stored in memory (e.g., adjust data structure 1100, FIG. 11) to account for the joint allocation of the recording in the user's storage space and for the conducting of the recording. Process 1400 then ends at step 1412.

If, at step 1420, the interactive media guidance application instead determines that a joint allocation is not possible, process 1400 proceeds to step 1426. At step 1426, the interactive media guidance application directs the user to delete an existing recording to make room on the recording device to perform the requested recording. For example, the interactive media guidance application may display a notice directing the user to delete an existing recording in a pop-up window, a new screen, or a window in the existing screen. At step 1428, the interactive media guidance application determines whether an existing recording was deleted. For example, the interactive media guidance application may determine whether the user provided an instruction (e.g., with input device 114) to control circuitry 116 to delete an existing recording. In some embodiments, the interactive media guidance application may also determine whether the user has deleted a sufficient number of recordings to accommodate the recording requested at step 1404. For example, if the recording requested at step 1404 is a 2-hour movie, and the user deletes a 30-min sitcom, the interactive media guidance application may direct the user to delete additional recordings to accommodate the 2-hour movie.

If the interactive media guidance application determines that the user deleted a sufficient number of recordings, process 1400 proceeds to step 1430. At step 1430, the interactive media guidance application performs the requested recording. For example, the interactive media guidance application may direct recording device 118 to record the media selected at step 1404 when it is transmitted to user equipment 110. In some embodiments, the interactive media guidance application may adjust its memory usage and memory allocation tables stored in memory (e.g., adjust data structure 1100, FIG. 11) to account for the conducting of the recording (e.g., adjust data structure 1100, FIG. 11). Process 1400 then ends at step 1412.

If, at step 1428, the interactive media guidance application instead determines that the user has not deleted a sufficient number of recordings to accommodate the requested recording, process 1400 proceeds to step 1432. At step 1432, the interactive media guidance application cancels the requested recording. For example, the interactive media guidance application may cancel the recording requested at step 1404. In some embodiments, the interactive media guidance application may display a notification informing the user that the scheduled recording has been canceled. The interactive media guidance application may also or instead provide the user with an option to re-schedule the recording (e.g., provide a reminder to re-schedule or automatically re-schedule) when the recording device has sufficient space to store the media (e.g., recording in the user's storage space, by increasing a flexible storage limit, or by using joint allocations). Process 1400 may then end at step 1412.

FIG. 15 is a flow chart of an illustrative process for predicting a user's expected use of recording device resources in accordance with one embodiment of the invention. In some embodiments, process 1500 may take place during step 1414 of process 1400 (FIG. 14). Process 1500 begins at step 1502. At step 1504, the interactive media guidance application selects a user of the system. For example, the interactive media guidance application may direct control circuitry 116 (FIG. 1) to identify all of the users of media system 100 (FIG. 1) that are authorized to use recording device 118 (FIG. 1). For example, the interactive media guidance application may identify all the users who in the past have scheduled a recording, and select one of the users. As another example, the interactive media guidance application may identify all of the users that have interacted with the media system in the past, or for whom a user account has been created, and select one of the identified users.

At step 1506, the interactive media guidance application identifies the selected user's past and future scheduled recordings. For example, the user may identify all past recordings performed by recording device 118 that are still stored in memory (e.g., non-deleted past recordings). As another example, the interactive media guidance application may identify all of the recordings scheduled by the user for recording by recording device 118 (e.g., future occurrences of a series recording). At step 1508, the interactive media guidance application determines the user's history of scheduling recordings. For example, the interactive media guidance application may retrieve from memory a listing of prior recordings scheduled by the user. The history of past scheduled recordings may include recordings that were scheduled and subsequently canceled (e.g., because of lack of space on the recording device, or in response to a user instruction), recordings that have been deleted, recordings that have not yet been viewed, recordings that have been viewed once or more times, or any other suitable past recording.

At step 1510, the interactive media guidance application predicts when new recordings will be scheduled based on the determined history of scheduling recordings. For example, the interactive media guidance application may determine, based on the prior history, that the user schedules a recording on a given channel at a given time every 3 weeks (e.g., because the user is away on a regular business trip, and the user watches the program as it is transmitted the remaining two weeks). The interactive media guidance application may then predict that, three weeks following the last recording, a new recording will be scheduled. As another example, the interactive media guidance application may determine that the user schedules a recording for a sporting event when the sporting event does not take place at a given location (e.g., record only Yankees road games). The interactive media guidance application may then predict that recordings will be scheduled for future sporting events that do not take place at the given location. As still another example, if the media system includes a calendar of the user's events, the interactive media guidance application may determine whether a program that the user usually watches takes place during an event. If the interactive media guidance application determines that an event will prevent the user from watching the program, the interactive media guidance application may predict that the user will schedule a recording.

At step 1512, the interactive media guidance application determines the user's history of deleting recordings. For example, the interactive media guidance application may retrieve from memory a listing of prior recordings that were deleted by the user. As another example, the interactive media guidance application may retrieve from memory a listing of prior recordings that were automatically deleted (e.g., because they were low priority). The history of past deleted recordings may include any other suitable information, such as for example whether the user viewed the recording, how long after viewing the recording was it deleted, the day and time the recording was viewed, deleted or both, the types of recordings that were deleted (e.g., genre, actor, transmission medium, or definition), or any other suitable information.

At step 1514, the interactive media guidance application predicts when past recordings will be deleted based on the determined history of deleting recordings. For example, the interactive media guidance application may determine, based on the prior history, that the user deletes recordings every weekend (e.g., watches and deletes three past recordings each weekend). The interactive media guidance application may then predict that past recordings will be deleted the following weekend (e.g., the number of recordings deleted may be predicted based on the user's viewing history). As another example, the interactive media guidance application may determine that sporting events are deleted with a few days of being recorded (e.g., delete recorded baseball games before the end of the series with the current opponent). The interactive media guidance application may then predict that past recordings of baseball games will likely be deleted 3 or 4 days after being recorded.

At step 1516, the interactive media guidance application predicts recording device resource use by the selected user based on the identified past and scheduled recordings, and predicted future recordings and future deletions. For example, the interactive media guidance application may determine the current amount of recording device resources used, and predict, at a given moment in time, how many new recordings will be performed, and how many recordings will be deleted (e.g., 20% currently used, new recordings scheduled will take 50% of the resources, and recordings taking 30% of the resources will be deleted). The interactive media guidance application may then calculate the expected use of recording device resources (e.g., 20+50−30=40% of the selected user's resources used). In some embodiments, the interactive media guidance application may determine how much of the recording device resources (e.g., not specific to the resources allotted to the selected user) the interactive media guidance application expects the user to use.

At step 1518, the interactive media guidance application determines whether all of the users of the media system have been selected. If the interactive media guidance application determines that all of the users have not been selected, process 1500 proceeds back to step 1504, and selects another user. If instead, at step 1518, the interactive media guidance application instead determines that all of the users have been selected, process 1500 proceeds to step 820 and ends.

FIG. 16 is a flow chart of an illustrative process for flexibly increasing a user's storage limit in accordance with one embodiment of the invention. In some embodiments, process 1600 may take place during step 1416 of process 1400 (FIG. 14). Process 1600 begins at step 1602. At step 1604, the interactive media guidance application may determine which storage limits to increase. For example, the interactive media guidance application may direct control circuitry 116 (FIG. 1) to retrieve from memory the current storage limits for each user, and to compare the space available to each user under current storage limits with the expected space needed to perform a requested recording. For example, the interactive media guidance application may identify the space available for each user who requested the recording that will be performed, and compare the space available with the space needed by each user (e.g., based on the expected size of the recording and on the allocation of the recording to each user).

At step 1606, the interactive media guidance application determines which storage limits to decrease. For example, the interactive media guidance application may determine which users have additional space remaining under current storage limits. As another example, the interactive media guidance application may identify the storage limits that were previously flexibly increased (e.g., at the expense of the user requesting the recording). In some embodiments, the interactive media guidance application may identify future recordings scheduled or expected for each user (e.g., within a near or far future), and compare the space needed to perform the future recordings with the space currently available to each user. The interactive media guidance application may then identify the users that have additional space available, and identify the storage limits associated with the identified users.

At step 1608, the interactive media guidance application determines the amount by which to increase and decrease the storage limits identified at step 1604 and 1606. For example, the interactive media guidance application may determine, for each user whose storage limit was identified to be increased at step 1604, the amount of space needed to perform the scheduled recording that exceeds the current amount of space available under each user's storage limit. As another example, the interactive media guidance application may determine, for each user whose storage limit was identified to be decreased at step 1606, the amount of space by which a user's storage limit may be reduced without preventing the user from performing some or all of the user's scheduled and expected recordings. At step 1610, the interactive media guidance application updates the storage limit of each user in memory. For example, the interactive media guidance application may direct control circuitry 116 to update the storage limit table stored in memory with the new increased and decreased storage limits. In some embodiments, the interactive media guidance application may also direct control circuitry 116 to store the initial storage limit and date/time at which the initial storage limit was modified in the storage limit table. Process 1600 then ends at step 1612.

Figure 17:
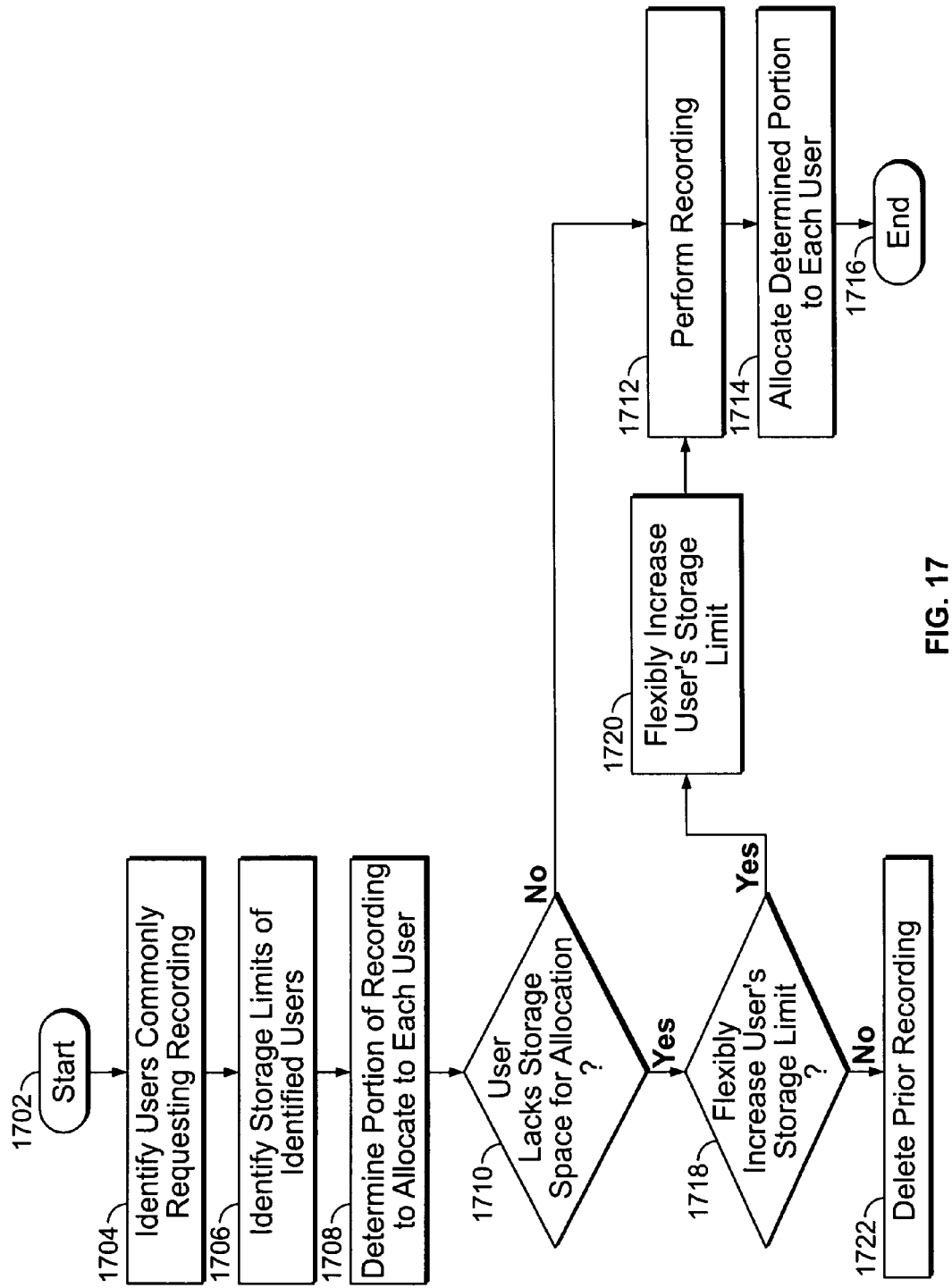
FIG. 17 is a flow chart of an illustrative process for jointly allocating storage space to several users in accordance with one embodiment of the invention.

FIG. 17 is a flow chart of an illustrative process for jointly allocating storage space to several users in accordance with one embodiment of the invention. In some embodiments, process 1700 may take place during step 1422 of process 1400 (FIG. 14). Process 1700 begins at step 1702. At step 1704, the interactive media guidance application identifies the users commonly requesting a recording. For example, the interactive media guidance application may direct control circuitry 116 (FIG. 1) to identify the users who directed recording device 118 (FIG. 1) to perform a particular recording. The interactive media guidance application may determine that recording requests from different users are directed to the same content using any suitable approach. For example, the interactive media guidance application may determine that users have requested to record the same program but at different transmission times by comparing one or more attributes associated with the content to be recorded (e.g., program IDs, titles, series ID/episode ID, and duration). In some embodiments, the interactive media guidance application may disregard different recording options set by different users (e.g., definition or length of buffer) and perform the recording using any suitable set of recording options (e.g., best options selected, average options selected, default options, or most common options selected).

At step 1706, the interactive media guidance application identifies the storage limits of the users identified at step

1704. For example, the interactive media guidance application may retrieve from memory a table of users with their associated storage limits. At step 1708, the interactive media guidance application determines the portion of the recording allocated to each user. The interactive media guidance application may determine the portion of the recording allocated to each user using any suitable approach. For example, the interactive media guidance application may allocate equal portions of the recording to each user. As another example, the interactive media guidance application may allocate portions to each user based on the space available under each user's storage limit. As still another example, the interactive media guidance application may allocate the recording based on the priority each user assigned to the recording (e.g., if three users requested the recording, two with high priority and one with low priority, the two users may each be allocated 40% of the recording, and the last user the remaining 20%).

At step 1710, the interactive media guidance application determines whether one of the users lacks storage space for storing the allocated portion of the recording. For example, the interactive media guidance application may determine the amount of space available to each user under the storage limit, and compare the amount of space with the expected amount of space taken up by each user's portion of the recording. If the interactive media guidance application determines that the user does not lack storage space for storing the allocated portion of the recording, process 1700 proceeds to step 1712. At step 1712, the interactive media guidance application performs the recording. For example, the interactive media guidance application may direct recording device 118 to perform the requested recording. At step 1714, the interactive media guidance application allocates the determined portion of the recording to each user. For example, the interactive media guidance application may direct control circuitry 116 to update the storage space allocations stored in memory with the additional portions of the recording. Process 1700 then ends at step 1716.

If, at step 1710, the interactive media guidance application instead determines that the user lacks sufficient storage space to store the user's allocated portion of the recording, process 1700 proceeds to step 1718. At step 1718, the interactive media guidance application determines whether the user's storage limit may be flexibly increased. For example, the interactive media guidance application may determine the amount of storage space allocated to other users that is currently and/or expected to be available. The user may then compare the amount of storage available to the amount of storage needed by the user to store the allocated portion of the recording. If the interactive media guidance application determines that the user's flexible storage limit may be increased, process 1700 proceeds to step 1020. At step 1020, the interactive media guidance application flexibly increases the user's storage limit. For example, process 1700 may call process 1600, FIG. 16. Process 1700 then moves to step 1712, described above.

If, at step 1718, the interactive media guidance application instead determines that the user's flexible storage limit may not be increased, process 1700 proceeds to step 1022. At step 1022, the interactive media guidance application deletes a prior recording. For example, the interactive media guidance application may prompt the user to select a prior recording to delete (e.g., and provide a recommendation), and delete a user selected prior recording. As another example, the interactive media guidance application may automatically delete a prior recording (e.g., in the absence of a user instruction). The interactive media guidance application may use any suitable criteria for determining which prior recording to delete, including for example whether the prior recording was watched, the priority of the prior recording, whether the prior recording will be transmitted again in the future (and can be re-recorded), or any other suitable criteria. Process 1700 then proceeds back to step 1710, described above. In some embodiments, if one user has insufficient storage space to support his percentage of the joint allocations storage (e.g., 50% of the storage in an equal allocation scenario) and flexible extension of the user's storage space does not accommodate the storage required, another user may bear a disproportionate percentage of the storage burden. In some embodiments, this may be considered a flexible extension of the first user's storage space into the other user's storage space.

FIG. 18 is a flow chart of an illustrative process for storing a requested recording in accordance with one embodiment of the invention. Process 1800 begins at step 1802. At step 1804, the interactive media guidance application receives a recording request. For example, the user may provide an instruction to perform a recording to control circuitry 116 (FIG. 1) using input device 114 (FIG. 1). As another example, the interactive media guidance application may automatically schedule a recording (e.g., automatically record programs of interest to the user). At step 1806, the interactive media guidance application identifies the storage space allocated to the recording. For example, the interactive media guidance application may identify the storage space allocated to the user requesting the recording. As another example, the interactive media guidance application may identify the storage space allocated to the usage associated with the recording. In some embodiments, the interactive media guidance application may identify the storage space allocated to both the user requesting the recording and to the usage associated with the requested recording.

At step 1808, the interactive media guidance application determines whether the identified storage space is sufficient to perform the recording. For example, the interactive media guidance application may compare the amount of identified storage space (e.g., amount of storage remaining in storage space defined by storage limit) with the expected amount of storage space required to perform the recording requested at step 1804. The interactive media guidance application may predict the amount of storage space required using any suitable approach, including for example based on the length of the recording, the quality of the recording, the media source (e.g., regular or high definition), or any other suitable criteria. If the interactive media guidance application determines that the identified storage space is sufficient to perform the requested recording, process 1800 may move to step 1810.

At step 1810, the interactive media guidance application performs the requested recording. For example, the interactive media guidance application may direct recording device 118 to record the media selected at step 1804 using the identified storage space when it is transmitted to user equipment 110 (FIG. 1). Process 1800 then ends at step 1812.

If, at step 1808, the interactive media guidance application instead determines that the identified storage space is not sufficient to perform the requested recording, process 1800 proceeds to step 1814. At step 1814, the interactive media guidance application identifies additional available storage space not initially allocated to performing the recording. For example, the interactive media guidance application may identify other storage space allocated to other users or usages, and determine which other allocate storage space is not full. In some embodiments, the interactive media guidance application may model the expected use of the other storage space (e.g., based on scheduled recordings, user recording habits, or user deleting habits) to identify the storage space that will have space available when the requested recording is to be performed (e.g., when the media is transmitted to user equipment 110, FIG. 1). If the interactive media guidance application cannot identify any other available storage space for performing recording, the interactive media guidance application may cancel the recording.

At step 1818, the interactive media guidance application performs the recording using first the storage space allocated to performing the recording (e.g., identified at step 1806), and subsequently the additional available storage space not initially allocated to performing the recording (e.g., identified at step 1814). For example, the interactive media guidance application may flexibly increase the storage limit of the identified storage space allocated to performing the recording. As another example, the interactive media guidance application may intelligently borrow storage space from other storage space not initially allocated to performing the recording. As still another example, the interactive media guidance application may jointly allocate the recording to different storage space allocated to performing the recording. Process 1800 then ends at step 1812.

FIG. 19 is a flow chart of an illustrative process for managing portions of storage space that have been set aside in accordance with one embodiment of the invention. Process 1900 begins at step 1902. In some embodiments, step 1902 may correspond to step 1806 of process 1800 (FIG. 18). At step 1904, the interactive media guidance application determines that a portion of the identified storage space allocated to performing the requested recording is set aside. For example, the interactive media guidance application may determine that a portion of the identified storage space is accessible only in response to a particular instruction from the user (e.g., in response to a password).

At step 1906, the interactive media guidance application receives an instruction to use the set aside portion of the storage space. For example, the interactive media guidance application may receive a user instruction to use the set aside portion of the storage space. In some embodiments, the instruction may include a password or other authorization information for accessing the set aside portion of the storage space. At step 1908, the interactive media guidance application performs the requested recording at least partially using the set aside portion of the identified storage space. For example, the interactive media guidance application may direct recording device 118 (FIG. 1) to record the selected media when it is transmitted to user equipment 110 (FIG. 1) and to at least partially perform the recording in the set aside portion of the identified storage space. Process 1900 then ends at step 1910.

The above described embodiments of the invention are presented for purposes of illustration and not of limitation, and the present invention is limited only by the claims which follow.

What is claimed is:

1. A method for performing a recording with a recording device available to a plurality of users comprising:
   receiving a request to perform a recording associated with at least two usages;
   identifying the user requesting the recording;
   determining that storage space allocated to the identified user is insufficient to perform the recording; and
   in response to determining that the storage space allocated to the identified user is insufficient to perform the recording, performing the recording at least partially using additional storage space not initially allocated to the identified user, wherein the additional storage space is allocated to each of the at least two usages.

2. The method of claim 1, wherein the additional storage space not initially allocated to the identified user is initially allocated to another user.

3. The method of claim 1, further comprising:
   determining how much storage space is needed in addition to the storage space allocated to the identified user; and
   in response to determining how much storage space is needed, identifying additional storage space allocated to another user available to be borrowed to perform the requested recording.

4. The method of claim 1, further comprising:
   predicting that storage space initially allocated to another user will be available; and
   wherein performing the recording at least partially using additional storage space not initially allocated to the identified user further comprises performing the recording at least partially using additional storage space predicted to be available.

5. The method of claim 4, wherein predicting that storage space initially allocated to another user will be available further comprises predicting that storage space will be available based on at least one of the other user's scheduled recordings, the other user's recording history, and the other user's deleting history.

6. The method of claim 1, wherein:
   the storage space allocated to the user is defined by a flexible storage limit; and
   performing the recording at least partially using additional storage space not initially allocated to the identified user further comprises flexibly increasing the storage limit defining the storage space allocated to the user.

7. The method of claim 6, further comprising flexibly decreasing the storage limit defining the storage space allocated to the initial user associated with the additional storage space.

8. The method of claim 1, further comprising:
   determining that at least a portion of the storage space allocated to the identified user is set aside;
   receiving an instruction to perform the recording using the set aside portion of the storage space; and
   performing the recording using the set aside portion of storage space.

9. The method of claim 8, wherein receiving an instruction to perform the recording using the set aside storage space further comprises receiving a password authorizing access to the set aside storage space.

10. A method for performing a recording with a recording device available to a plurality of users, comprising:
    receiving a request to perform a recording;
    identifying at least two usages associated with the requested recording;
    identifying storage space allocated to each of the at least two identified usages; and
    in response to identifying the storage space allocated to each of the at least two identified usages, performing the recording using each of the at least two identified storage spaces.

11. The method of claim 10, wherein one of the at least two usages is selected from the group consisting of the type of media recorded, genre, actor, producer, ranking, rating, channel, time transmitted, and media source.

12. The method of claim 10, further comprising:
    determining that the storage space allocated to the identified usage is insufficient to perform the recording; and in response to determining that the storage space allocated to the identified usage is insufficient to perform the recording, performing the recording at least partially using additional storage space not initially allocated to the identified usages.

13. The method of claim 12, wherein:
the storage space allocated to the usages is defined by a flexible usage storage limit; and
performing the recording at least partially using additional storage space not initially allocated to the identified usages further comprises flexibly increasing the storage limit defining the storage space allocated to the usage.

14. The method of claim 13, further comprising flexibly decreasing the storage limit defining the storage space allocated to the initial user associated with the additional storage space.

15. The method of claim 10, wherein performing the recording using the identified storage space further comprises allocating the recording to the storage space jointly allocated to all of the at least two identified usages.

16. A method for performing a recording with a recording device available to a plurality of users, comprising:
receiving a request to perform a recording associated with at least two usages;
identifying at least two users requesting the recording;
identifying storage space allocated to each of the at least two users and to each of the at least two usages; and
in response to identifying the storage space allocated to each of the at least two users, performing the recording using the identified storage space allocated to each of the at least two users and to each of the at least two usages.

17. The method of claim 16, wherein identifying the storage space allocated to each of the at least two users further comprises identifying storage space jointly allocated to all of the at least two users.

18. The method of claim 17, further comprising:
determining the portion of the recording to allocate to the storage space allocated to each of the at least two users; and
performing the recording by allocating the determined portions of the recording to the storage space allocated to each of the at least two users.

19. The method of claim 18, wherein determining the portion of the recording to allocate to the storage space allocated to each of the at least two users further comprises determining the portion of the recording to allocate to the storage space allocated to each of the at least two users based on at least one of each of the at least two users' storage limit, storage space available, priority assigned to the recording, and the relative priority of each of the at least two users.

20. The method of claim 16, wherein identifying at least two users requesting the recording further comprises identifying at least two users requesting different transmissions of the content requested to be recorded.

21. A method for performing a recording with a recording device available to a plurality of users, comprising:
receiving a request to perform a recording using the recording device, wherein the recording device comprises general storage space and set aside storage space accessible only to recordings associated with the set aside storage space, and wherein the set aside storage space is allocated to each of at least two usages;
determining whether the requested recording is associated with set aside storage space; and
in response to determining that the requested recording is associated with the set aside storage space, performing the recording using the set aside storage space.

22. The method of claim 21, further comprising flexibly increasing the size of the set aside storage space.

23. The method of claim 21, wherein the set aside storage space is allocated to at least one of a user and a usage.

24. The method of claim 21, wherein the set aside storage space is jointly allocated to at least one of at least two users and at least one user and at least one usage.

* * * * *